United States Patent
Kawakita

(10) Patent No.: US 12,126,641 B2
(45) Date of Patent: Oct. 22, 2024

(54) ATTACK SITUATION VISUALIZATION DEVICE, ATTACK SITUATION VISUALIZATION METHOD AND RECORDING MEDIUM

(71) Applicant: NEC Corporation, Tokyo (JP)

(72) Inventor: Masaru Kawakita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/107,172

(22) Filed: Feb. 8, 2023

(65) Prior Publication Data
US 2023/0199013 A1    Jun. 22, 2023

Related U.S. Application Data

(63) Continuation of application No. 16/626,027, filed as application No. PCT/JP2017/023889 on Jun. 29, 2017, now Pat. No. 11,611,575.

(51) Int. Cl.
*H04L 9/40*        (2022.01)
*H04L 43/045*      (2022.01)

(52) U.S. Cl.
CPC ........ *H04L 63/1425* (2013.01); *H04L 43/045* (2013.01); *H04L 2463/146* (2013.01)

(58) Field of Classification Search
USPC .......................................................... 726/23
See application file for complete search history.

(56) References Cited

U.S. PATENT DOCUMENTS

| 2006/0221077 A1 | 10/2006 | Wright .................. G06T 3/4023 345/428 |
| 2006/0288296 A1 | 12/2006 | Rosenbluth ......... H04L 63/1458 370/254 |

(Continued)

FOREIGN PATENT DOCUMENTS

| EP | 2109280 A1 | 10/2009 |
| JP | 2014230041 A | 12/2014 |

(Continued)

OTHER PUBLICATIONS

Chen et al, Arrow drawing method of battlefield group moving situation, Chinese Patent Application, Oct. 10, 2023, pp. 1-11 (Year: 2023).*

(Continued)

*Primary Examiner* — Sakinah White Taylor
(74) *Attorney, Agent, or Firm* — Sughrue Mion, PLLC

(57) ABSTRACT

An attack situation visualization device includes: a memory that stores instructions; and at least one processor configured to process the instructions to: analyze a log in which information about a cyberattack is recorded and specify at least either of a source of a communication related to the cyberattack and a destination of a communication related to the cyberattack; and generate display information allowing display of an image in which an image representing a map, a source image representing the source, and a destination image representing the destination are arranged on the map, wherein, the at least one processor configured to process the instructions to generate the display information including an attack situation image visualizing at least either of a traffic volume and a communication frequency of a communication related to the cyberattack between the source and the destination.

35 Claims, 25 Drawing Sheets

(56) References Cited

U.S. PATENT DOCUMENTS

| | | | | |
|---|---|---|---|---|
| 2007/0118909 | A1 | 5/2007 | Hertzog | G06F 21/652 726/23 |
| 2012/0101952 | A1 | 4/2012 | Raleigh | H04L 12/1417 709/223 |
| 2013/0111576 | A1 | 5/2013 | Devine | H04L 41/5067 726/11 |
| 2015/0121523 | A1 | 4/2015 | Crowley | G06Q 10/06 726/23 |
| 2015/0373588 | A1 | 12/2015 | Raleigh | H04L 12/1407 |
| 2016/0308739 | A1* | 10/2016 | Benjamin | H04L 43/12 |
| 2016/0359872 | A1 | 12/2016 | Yadav | H04L 63/1406 |
| 2016/0373588 | A1 | 12/2016 | Raleigh | H04L 12/1407 |
| 2017/0085587 | A1* | 3/2017 | Turgeman | G06F 21/32 |
| 2017/0103674 | A1* | 4/2017 | Sadeh-Koniecpol | G06F 21/566 |
| 2017/0126740 | A1* | 5/2017 | Bejarano Ardila | H04L 63/1433 |
| 2017/0251003 | A1* | 8/2017 | Rostami-Hesarsorkh | G06N 5/01 |

FOREIGN PATENT DOCUMENTS

| | | | | |
|---|---|---|---|---|
| JP | 2015026182 | A | 2/2015 | |
| JP | 2015216549 | A * | 12/2015 | |
| WO | WO-0221300 | A1 | 3/2002 | G06F 16/958 |

OTHER PUBLICATIONS

Falk et al, System and Method for Reliably Authenticating an Appliance, European Patent Application, Nov. 16, 2016, pp. 1-12 (Year: 2016).*

JP Office Action for JP Application No. 2022-193377, mailed on Jan. 30, 2024 with English Translation.

"Digital Attack Map", a map of the world that shows exactly where large-scale DDoS attacks occur just now, Gigazine, Internet<https://gigazine.net/news/20161110-digital-attack-map/>, Nov. 10, 2016.

* cited by examiner

Fig. 8

| SEQUENCE NUMBER | ITEM | VALUE |
|---|---|---|
| 1 | DATE AND TIME | 2016-10-15T18:12:00+09:00 |
| | SOURCE (IP ADDRESS) | 192.168.0.1 |
| | DESTINATION (IP ADDRESS) | - |
| | DESTINATION PORT NUMBER | 23 |
| | TRAFFIC VOLUME [BYTES] | 100000 |
| 2 | DATE AND TIME | 2016-10-15T18:12:30+09:00 |
| | SOURCE (IP ADDRESS) | 192.168.10.2 |
| | DESTINATION (IP ADDRESS) | 203.0.113.10 |
| | DESTINATION PORT NUMBER | 80 |
| | TRAFFIC VOLUME [BYTES] | 2000 |
| ... | ... | ... |

| LOG TYPE | SOURCE IP ADDRESS | DESTINATION IP ADDRESS |
|---|---|---|
| A | NO | YES |
| B | YES | NO |
| C | YES | YES |

Fig. 12

| ATTACKER (ATTACKER GROUP) | SOURCE IP ADDRESS | DESTINATION PORT NUMBER |
|---|---|---|
| APT_2 | 192.168.0.1 | 22 |
| E_Group | 192.168.100.1 | 80 |
| XX_warm | 192.168.200.1 | 8080 |
| ... | ... | ... |

Fig. 13

| VICTIM (VICTIM ORGANIZATION) | DESTINATION IP ADDRESS |
|---|---|
| MUNICIPALITY | 172.xxx.xxx.xxx |
| POWER GENERATION FACILITY | 172.xxx.xxx.xxx |
| PRIVATE ENTERPRISE | 10.xxx.xxx.xxx |
| ... | ... |

| ATTACKER | COLORATION |
|---|---|
| APT_2 | #ff0000 (red) |
| E_Group | #000080 (navy) |
| XX_warm | #a52a2a (brown) |
| ... | ... |

| VICTIM | COLORATION |
|---|---|
| MUNICIPALITY | #00ff00 (lime) |
| POWER GENERATION FACILITY | #b22222 (firebrick) |
| PRIVATE ENTERPRISE | #3cb371 (mediumseagreen) |
| ... | ... |

| PORT NUMBER | COLORATION |
|---|---|
| 22 | #ff0000 (red) |
| ... | ... |

ATTACK SITUATION VISUALIZATION DEVICE, ATTACK SITUATION VISUALIZATION METHOD AND RECORDING MEDIUM

CROSS REFERENCE TO RELATED APPLICATIONS

This application is a Continuation of U.S. application Ser. No. 16/626,027 filed Dec. 23, 2019, which is a National Stage of International Application No. PCT/JP2017/023889 filed Jun. 29, 2017.

TECHNICAL FIELD

The present disclosure relates to a technology of clearly visualize a cyberattack situation.

BACKGROUND ART

In analysis of a security-related attack such as a cyberattack, collected information may be visualized. For example, following PTLs 1 and 2 describe technologies of displaying information related to a cyberattack.

PTL 1 (Japanese Unexamined Patent Application Publication No. 2015-26182) describes a technology of collecting information indicating a security-related attack and, for a user of a security service, visualizing an attack against which the service allows defense.

PTL 2 (Japanese Unexamined Patent Application Publication No. 2015-216549) describes a technology of displaying an image indicating a level of a cyberattack between an image representing a device in which the cyberattack is detected and an image representing the globe.

Furthermore, PTL 3 (Japanese Unexamined Patent Application Publication No. 2014-230041) describes a technology of visualizing a configuration and an operation of a network.

CITATION LIST

Patent Literature

PTL 1: Japanese Unexamined Patent Application Publication No. 2015-26182
PTL 2: Japanese Unexamined Patent Application Publication No. 2015-216549
PTL 3: Japanese Unexamined Patent Application Publication No. 2014-230041

SUMMARY OF INVENTION

Technical Problem

With increase and sophistication of cyberattacks, an amount of information visualized in relation to cyberattacks has increased, and also a content of displayed information has undergone complication.

The technology described in aforementioned PTL 1 is merely a technology of displaying an attack against which a security service allows defense. The technology described in aforementioned PTL 2 is a technology assuming that a log allowing specification of both an attack target and an attack source is given. The technology described in PTL 3 is merely a visualization technology of a network configuration.

Information about a cyberattack does not always include information allowing specification of both an attack target and an attack source. In such a situation, for example, even when the technology described in each of the aforementioned patent literatures is used, it is difficult to suitably display a situation of a cyberattack, and the like.

The technology according to the present disclosure has been developed in view of such circumstances. Specifically, a main object of the present disclosure is to provide a technology of clearly visualizing a situation of a security-related attack such as a cyberattack.

Solution to Problem

In order to achieve the aforementioned object, an attack situation visualization device according to an aspect of the present disclosure includes a configuration as described below. The attack situation visualization device according to the aspect of the present disclosure includes: log analysis means configured to analyze a log in which information about a cyberattack is recorded and specify at least either of a source of a communication related to the cyberattack and a destination of a communication related to the cyberattack; and display information generation means configured to generate display information allowing display of an image in which an image representing a map, a source image representing the source, and a destination image representing the destination are arranged on the map, wherein, when a correspondence relation between the source and the destination to which a communication related to the cyberattack is transmitted from the source is specified, the display information generation means generates the display information including an attack situation image visualizing at least either of a traffic volume and a communication frequency of a communication related to the cyberattack between the source and the destination.

An attack situation visualization method according to an aspect of the present disclosure includes a configuration as described below. The attack situation visualization method according to the aspect of the present disclosure includes: analyzing a log in which information about a cyberattack is recorded and specifying at least either of a source of a communication related to the cyberattack and a destination of a communication related to the cyberattack: generating display information allowing display of an image in which an image representing a map, a source image representing the source, and a destination image representing the destination are arranged on the map; and, when a correspondence relation between the source and the destination to which a communication related to the cyberattack is transmitted from the source is specified, generating the display information including an attack situation image visualizing at least either of a traffic volume and a communication frequency of a communication related to the cyberattack between the source and the destination.

Further, the aforementioned object is also achieved by a computer program (attack situation visualization program) providing, by a computer, the attack situation visualization device, the attack situation visualization method, and the like that include the aforementioned configurations, and a computer-readable recording medium or the like having the computer program stored thereon.

The recording medium according to an aspect of the present disclosure may have the aforementioned computer program recorded thereon. The recording medium having an attack situation visualization program recorded thereon, the attack situation visualization program causing a computer to execute: processing of analyzing a log in which information about a cyberattack is recorded and specifying at least either of a source of a communication related to the cyberattack and a destination of a communication related to the cyberattack: processing of generating display information allowing display of an image in which an image representing a map, a source image representing the source, and a destination image representing the destination are arranged on the map; and processing of, when a correspondence relation between the source and the destination to which a communication related to the cyberattack is transmitted from the source is specified, generating the display information including an attack situation image visualizing at least either of a traffic volume and a communication frequency of a communication related to the cyberattack between the source and the destination.

Advantageous Effects of Invention

The present disclosure can clearly visualize a situation of a security-related attack such as a cyberattack.

BRIEF DESCRIPTION OF DRAWINGS

FIG. 8 is a diagram illustrating a specific example of a log.

FIG. 11 is a diagram illustrating a specific example of a log type table.

FIG. 12 is a diagram illustrating a specific example of an attacker table.

FIG. 13 is a diagram illustrating a specific example of a victim table.

FIG. 14 is a diagram illustrating a specific example of a coloration table.

EXAMPLE EMBODIMENT

Figure 1:
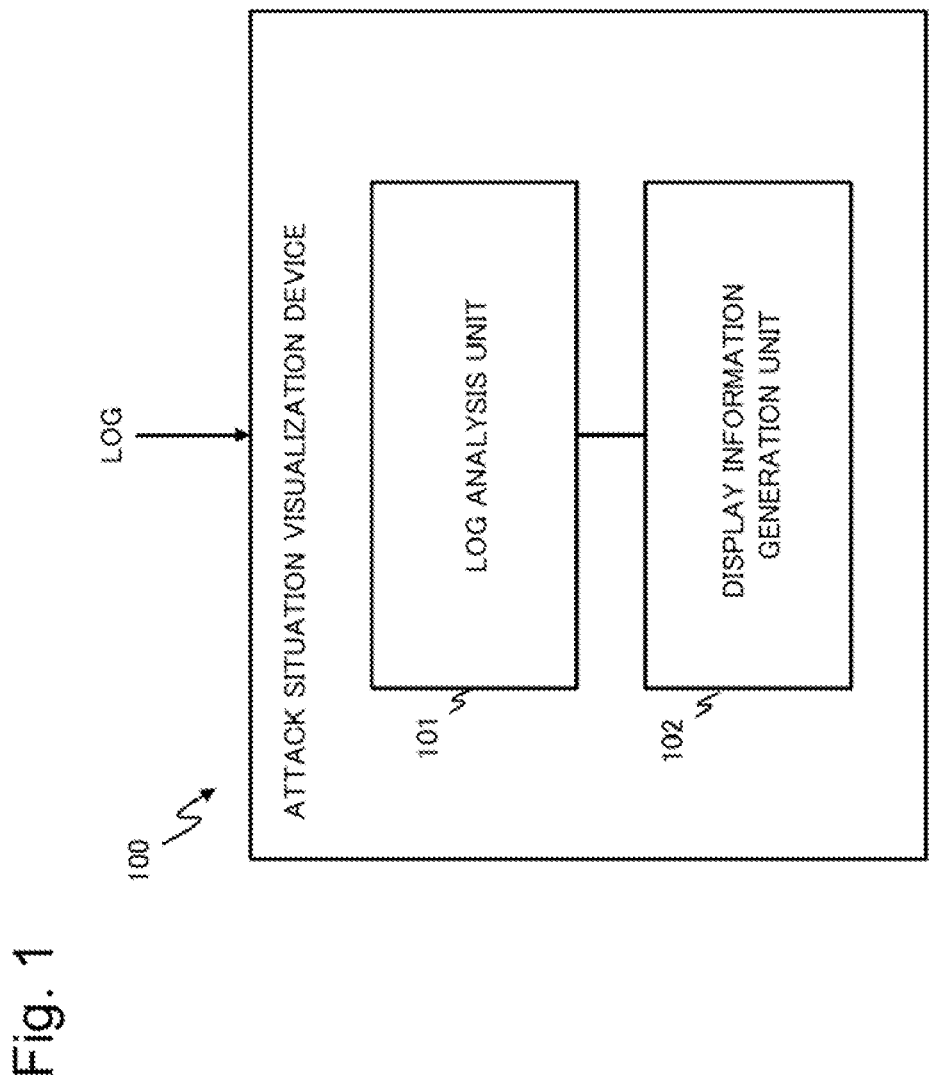
FIG. 1 is a block diagram illustrating a functional configuration of an attack situation visualization device according to a first example embodiment of the present disclosure.

Prior to detailed description of each example embodiment, technical considerations and the like related to the present disclosure will be described in detail. For convenience of description, malicious software programs are hereinafter collectively described as malware. Further, security-related attacks in a cyberspace are collectively described as cyberattacks.

When a cyberattack giving an improper instruction to information communication equipment such as a computer, or the like occurs, an analyst collects and analyzes information about the cyberattack. For example, by specifying countries or areas where an attack source and an attack target exist and analyzing a scale and a frequency of the cyberattack being executed, the analyst may acquire useful information about the cyberattack. For example, an attack source refers to a source of a communication related to an attack, and an attack target refers to a destination of a communication related to an attack.

However, information about a cyberattack (for example, a log) may not necessarily include both a source and a destination, and may only include either type of information. Further, an attacker may hide a source of a cyberattack. In other words, source information of a communication related to a cyberattack may be disguised. Further, when an attack is executed through a so-called springboard machine, a bot, or the like, direct source information of a communication [for example, a source field in an Internet Protocol (IP) address] related to the cyberattack may not necessarily be reliable.

Considering the situation described above, the present inventors have arrived at an idea of the technology according to the present disclosure capable of suitably visualizing a situation related to a cyberattack when at least either type of information being a source or a destination of the cyberattack is acquired.

For example, a device being one mode of the technology according to the present disclosure described below may be configured to analyze a log in which information about a cyberattack is recorded and specify at least either of a source of a communication related to the cyberattack and a destination of the communication related to the cyberattack. Further, for example, such a device may be configured to generate image information acquired by arranging an image representing a map, a source image representing a source of a communication related to a cyberattack, and a destination image representing a destination on a map. Further, such a device may generate image information for displaying an attack situation image visualizing at least either of a traffic volume and a communication frequency of a communication related to a cyberattack between a source and a destination, according to a connection relation between the source and the destination. The source image, the destination image, and the attack situation image are not limited to static images and may be images including motions such as animations.

For example, the technology according to the present disclosure including the configuration as described above can clearly visualize a situation of a security-related attack such as a cyberattack. The reason is that, even when only either of a source and a destination can be specified from information about a cyberattack, an image representing a situation of the attack at the source or the destination can be displayed. Further, when a connection relation between a source and a destination related to a cyberattack can be specified, an image visualizing a traffic volume and a communication frequency of a communication related to the cyberattack can be clearly displayed.

The technology according to the present disclosure will be specifically described below by use of specific example embodiments. Configurations of the following specific example embodiments (and a modified example thereof) are exemplifications and do not limit the technical scope of the technology according to the present disclosure. Allocation (for example, function-based allocation) of components constituting each of the following example embodiments is an example by which the example embodiment can be provided. Configurations by which the respective example embodiments can be provided are not limited to the following exemplifications, and various configurations may be assumed. A component constituting each of the following example embodiments may be further divided, and also one or more components constituting each of the following example embodiments may be integrated.

When each example embodiment exemplified below is provided by use of one or more physical devices or virtual devices, or a combination thereof, one or more components may be provided by one or more devices, and one component may be provided by use of a plurality of devices. A specific example of a hardware configuration of a device capable of providing each example embodiment will be described later.

First Example Embodiment

A first example embodiment of the technology according to the present disclosure will be described below.
Configuration
FIG. 1 is a block diagram illustrating a functional configuration of an attack situation visualization device 100 according to the present example embodiment.

For example, various types of security-related information (for example, a log) are supplied to the attack situation visualization device 100. For example, information provided for the attack situation visualization device 100 may include logs recorded in various types of servers (for example, a web server, a proxy server, and a file server), logs recorded in various types of network equipment (for example, a router, a switch, and an access point), logs recorded in various types of security equipment (for example, a firewall, an intrusion detection device, an intrusion prevention device, and a security appliance).

The attack situation visualization device 100 may acquire logs from the aforementioned various types of devices and systems. Further, the attack situation visualization device 100 may acquire the aforementioned logs from a database server, a file server, and the like in which the logs are recorded. Various types of devices, systems, and the like capable of providing logs for the attack situation visualization device 100 may be hereinafter collectively and simply described as "log sources."

Logs provided for the attack situation visualization device 100 are not particularly limited, and various types of logs may be included. Such logs may typically include logs related to various types of communications that may be related to cyberattacks.

Specifically, a log may include information allowing specification of a source (transmission source) of a communication related to a cyberattack. Further, a log may include information indicating a destination of a communication related to a cyberattack. One log may include both information indicating a source and information indicating a destination, and may include only either. Information indicating a source or a destination may typically be an Internet Protocol (IP) address but is not limited thereto. For example, a host name, a media access control (MAC) address, and a uniform resource locator (URL) may be used as information indicating a source or a destination of communication data. Further, various types of information (for example, a content of communication data and communication control) other than the aforementioned source and destination may be appropriately recorded in a log.

Functional components of the attack situation visualization device 100 according to the present example embodiment will be described below. As illustrated in FIG. 1, the attack situation visualization device 100 according to the present example embodiment includes a log analysis unit 101 and a display information generation unit 102. The functional components constituting the attack situation visualization device 100 may be communicably connected to one another by a suitable communication method. A connecting line between components drawn in FIG. 1 illustrates a main connection relation between the components and does not limit communication of data, a signal, control, and the like between the components.

The log analysis unit 101 (log analysis means) is configured to analyze a log provided from a log source and specify at least either of a source of a communication related to a cyberattack and a destination of the communication related to the cyberattack.

The log analysis unit 101 is configured to analyze a provided log by appropriately using a suitable analysis method based on a format and the like of such a log. For example, such an analysis method may include pattern matching and an analysis using a regular expression. When a log format is known, the log analysis unit 101 may appropriately extract information recorded in a log, based on the format.

One mode of the log analysis unit 101 may be configured to, by use of information indicating a source and a destination of communication data acquired by analyzing a log, specify geographical locations (areas or countries) or the like where a source and a destination are arranged. A case of information allowing specification of a source and information indicating a destination including IP addresses is assumed as a specific example. In this case, for example, the log analysis unit 101 may specify areas or countries allocated with the IP addresses, by use of a domain name system (DNS), a WHOIS service, and the like.

One mode of the log analysis unit 101 may be configured to, by analyzing a log, specify a correspondence relation between a source of a communication related to a cyberattack and a destination being attacked by the source. For example, with regard to a source of a communication related to a cyberattack, by specifying a destination to which communication data are transmitted from the source, the log analysis unit 101 may tie the source to the destination.

One mode of the log analysis unit 101 may be configured to, by analyzing a log, calculate a traffic volume related to a communication transmitted from a source and a frequency (communication frequency) with which communications are executed. For example, the log analysis unit 101 may extract, out of one or more logs, a record related to a communication transmitted from a source within a specific time range (for example, a unit time) and calculate a traffic volume from a size of communication data recorded in the extracted record. By counting a number of extracted records, the log analysis unit 101 may also calculate a communication frequency. Similarly, the log analysis unit 101 may be configured to, by analyzing a log, calculate a traffic volume related to a communication transmitted to a destination and a frequency (communication frequency) with which communications are executed. A calculation method of a traffic volume and a communication frequency may be appropriately selected including a known technology.

When a correspondence relation between a source related to a cyberattack and a destination attacked by the source is specified, the log analysis unit 101 may calculate a traffic volume and a communication frequency between the two. The log analysis unit 101 may calculate the traffic volume and the communication frequency by a method similar to the above.

The display information generation unit 102 (display information generation means) is configured to generate display information allowing display of a display image in which an image representing a map, a source image representing the aforementioned source, and a destination image representing the aforementioned destination are arranged on a map.

For example, display information may be image data representing a display image itself to be displayed or may be various types of data used for generation of a display image. For example, display information may include a script, an executable binary, or the like capable of executing generation processing of a display image. For example, display information may include a control signal for controlling a display device displaying a display image.

A format of a display image is not particularly limited and may be appropriately selected. For example, a display image may be expressed by use of a vector-format image data or by use of a raster-format image data.

A display image is not limited to a static image and may include various types of dynamic images (including an animation). In other words, a source image representing a source and a destination image representing a destination may be displayed by use of static images or by use of dynamic images such as animations.

According to a correspondence relation between a source and a destination, the display information generation unit 102 may generate display information for displaying an attack situation image visualizing a situation of a cyberattack between the source and the destination. For example, an attack situation image may be an image allowing visualization of at least either of a traffic volume and a communication frequency of a communication related to a cyberattack. Further, an attack situation image may also be an image allowing visualization of a direction of a communication between a source and a destination.

Figure 2:
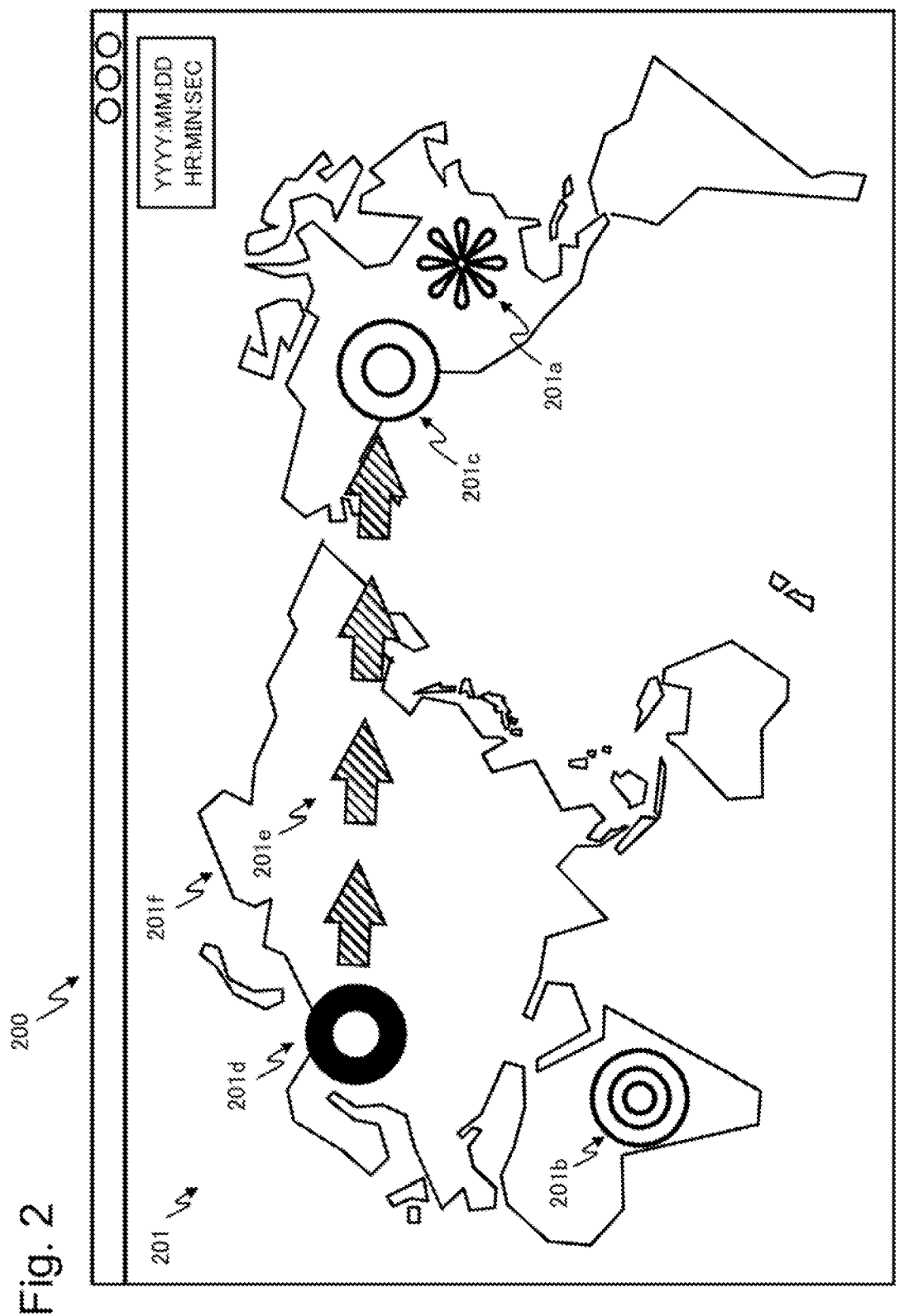
FIG. 2 is a diagram illustrating a specific example of an attack situation visualized by the attack situation visualization device according to the first example embodiment of the present disclosure.

A display image displayed according to display information generated by the display information generation unit 102 will be described below by use of a specific example. FIG. 2 is a diagram illustrating a specific example of a user interface 200 including a display image 201 displayed in accordance with display information generated by the display information generation unit 102. FIG. 2 is a diagram illustrating a specific example for description and does not limit the present example embodiment.

For example, the user interface 200 may be displayed as part of a graphical user interface (GUI) provided in various types of information processing devices (such as a computer and a mobile terminal) each equipped with a display screen. A type of the display screen is not particularly limited. The information processing device equipped with a display screen may be the same device as the attack situation visualization device 100 or a different device.

For example, the user interface 200 may be displayed as part of a screen constituting an application executed in various types of information processing devices. For example, such an application may be various types of security guard software or a general application such as a browser.

The display information generation unit 102 may generate display information representing a display image itself (that is, image data) displayed on the user interface 200. Further, the display information generation unit 102 may generate various types of data used for generating a display image displayed on the user interface 200. For example, such data may include a shape (including a size [dimensions], hereinafter the same), a hue, a position, and vertex information that are related to each image included in a display image but is not limited thereto. Further, display information may include a script, an executable binary, or the like causing an application for displaying the user interface 200 to execute generation processing of a display image. In this case, a display image may be displayed on the user interface 200 by interpreting (or executing) the script or the executable binary included in such display information by the application receiving the display information.

As illustrated in FIG. 2, a map (201f in FIG. 2) is displayed on the display image 201. Source images (201b and 201d in FIG. 2) representing sources of cyberattacks and destination images (201a and 201c in FIG. 2) are displayed on the map 201f. Further, when a correspondence relation between a source and a destination that are related to a cyberattack is specified, an attack situation image (201e in FIG. 2) is displayed between a source image (201d in FIG. 2) and a destination image (201c).

For example, the map 201f may be an image in which a world map drawn on Mercator's projection is displayed as a blank map. For example, in order to improve visual recognizability, the display information generation unit 102 may create a map 201f by deforming (for example, simplifying) part of a world map. The display information generation unit 102 may be able to change an area displayed as a center of the map 201f, by a setting or the like. The display information generation unit 102 may generate a map 201f displaying a border line, a demarcation line between areas, and the like. While the map 201f is a planar map in the specific example illustrated in FIG. 2, the present example embodiment is not limited thereto. For example, a globe-shaped map may be displayed as a map 201*f*.

In the specific example illustrated in FIG. 2, the source image 201*b* and the source image 201*d* are illustrated as source images.

The source image 201*b* is an image representing a source of a cyberattack when only the source is specified from one or more logs. For example, when only a source of a communication related to a cyberattack is specified and a destination of the communication cannot be specified, the display information generation unit 102 may generate display information in such a way that the source image 201*b* is displayed as an image representing the source.

The source image 201*d* is an image representing a source of a cyberattack when a correspondence relation between the source and a destination of the cyberattack is specified from one or more logs. For example, when both a source and a destination of a communication related to a cyberattack can be specified, the display information generation unit 102 may generate display information in such a way that the source image 201*d* is displayed as an image representing the source.

As illustrated in FIG. 2, the source image 201*b* and the source image 201*d* are displayed in distinguishable display forms. In the specific example illustrated in FIG. 2, the source image 201*b* and the source image 201*d* have different shapes. Without being limited to the above, the source image 201*b* and the source image 201*d* may be images differing in a display form other than a shape. Specifically, for example, the source image 201*b* and the source image 201*d* may be images differing in at least one of a shape, a pattern, a hue, a size, and an animation method.

The display information generation unit 102 generates display information in such a way that different images as described above are displayed for the source image 201*b* and the source image 201*d*. Consequently, even when a source and a destination are not specified, a user can readily and visually recognize that a source is executing some attack.

One mode of the display information generation unit 102 may generate display information causing a display form of the source image 201*b* or the source image 201*d* to change according to at least either of a traffic volume (source traffic volume) and a communication frequency (source communication frequency) that are related to a communication transmitted from the source.

Shapes of the source image 201*b* and the source image 201*d* that are illustrated in FIG. 2 are specific examples for description and do not limit the present example embodiment.

In the specific example illustrated in FIG. 2, the destination image 201*a* and the destination image 201*c* are illustrated as destination images.

The destination image 201*a* is an image representing a destination of a cyberattack when only the destination is specified from one or more logs. For example, when only a destination of a communication related to a cyberattack is specified and a source of the communication cannot be specified, the display information generation unit 102 may generate display information in such a way that the destination image 201*a* is displayed as an image representing the destination.

The destination image 201*c* is an image representing a destination of a communication related to a cyberattack when a correspondence relation between a source and the destination of the communication is specified from one or more logs. For example, when both a source and a destination of a communication related to a cyberattack can be specified, the display information generation unit 102 may generate display information in such a way that the destination image 201*c* is displayed as an image representing the destination.

As illustrated in FIG. 2, the destination image 201*a* and the destination image 201*c* are displayed in distinguishable display forms. In the specific example illustrated in FIG. 2, the destination image 201*a* and the destination image 201*c* have different shapes. Without being limited to the above, the destination image 201*a* and the destination image 201*c* may be images differing in a display form other than a shape. Specifically, for example, the destination image 201*a* and the destination image 201*c* may be images differing in at least one of a shape, a pattern, a hue, and an animation method.

The display information generation unit 102 generates display information in such a way that different images as described above are displayed for the destination image 201*a* and the destination image 201*c*. Consequently, even when a source and a destination are not specified, a user can readily and visually recognize that a destination is under some attack.

One mode of the display information generation unit 102 may generate display information causing a display form of the destination image 201*a* or the destination image 201*c* to change according to at least either of a traffic volume and a communication frequency at the destination. Shapes of the destination image 201*a* and the destination image 201*c* illustrated in FIG. 2 are specific examples for description and do not limit the present example embodiment.

The attack situation image 201*e* is an image visualizing an attack situation between a source and a destination of a communication related to a cyberattack when a correspondence relation between the source and the destination is specified. Specifically, the attack situation image 201*e* is an image visualizing at least either a traffic volume and a communication frequency between the source and the destination. The attack situation image 201*e* is displayed in a display form varying according to at least either of a traffic volume and a communication frequency between the source and the destination. For example, the display information generation unit 102 generates display information causing at least one of a shape, a pattern, a hue, and an animation method of the attack situation image 201*e* to change according to at least either of a traffic volume and a communication frequency between the source and the destination.

The attack situation image 201*e* includes a drawing element (an object drawn in an image, hereinafter described as an "attack line") representing an attack directed from a source to a destination. In FIG. 2, an attack line has an arrow shape but the present example embodiment is not limited thereto. For example, an attack line may be expressed by use of a suitable line (a straight line or a curve) linking a source to a destination. For example, the attack situation image 201*e* may be an animation image in which a display form of an attack line dynamically changes. For convenience of description, an attack line having an almost arrow shape illustrated in FIG. 2 will be described below as a specific example.

As an example, the attack situation image 201*e* may be an animation image intermittently displaying movement of one attack line (arrow-shaped image) or an animation image continuously displaying movement of a plurality of attack lines. As another example, the attack situation image 201*e* may be, for example, an animation image in which an attack line itself does not move, and a gradation of a hue or a pattern of the attack line changes. As yet another example, the attack situation image 201e may be an animation image in which one attack line (for example, one arrow) extends in such a way as to connect between the source image 201d and the destination image 201c. Without being limited to the above, the attack situation image 201e may be an animation image employing another animation method.

Figure 3:
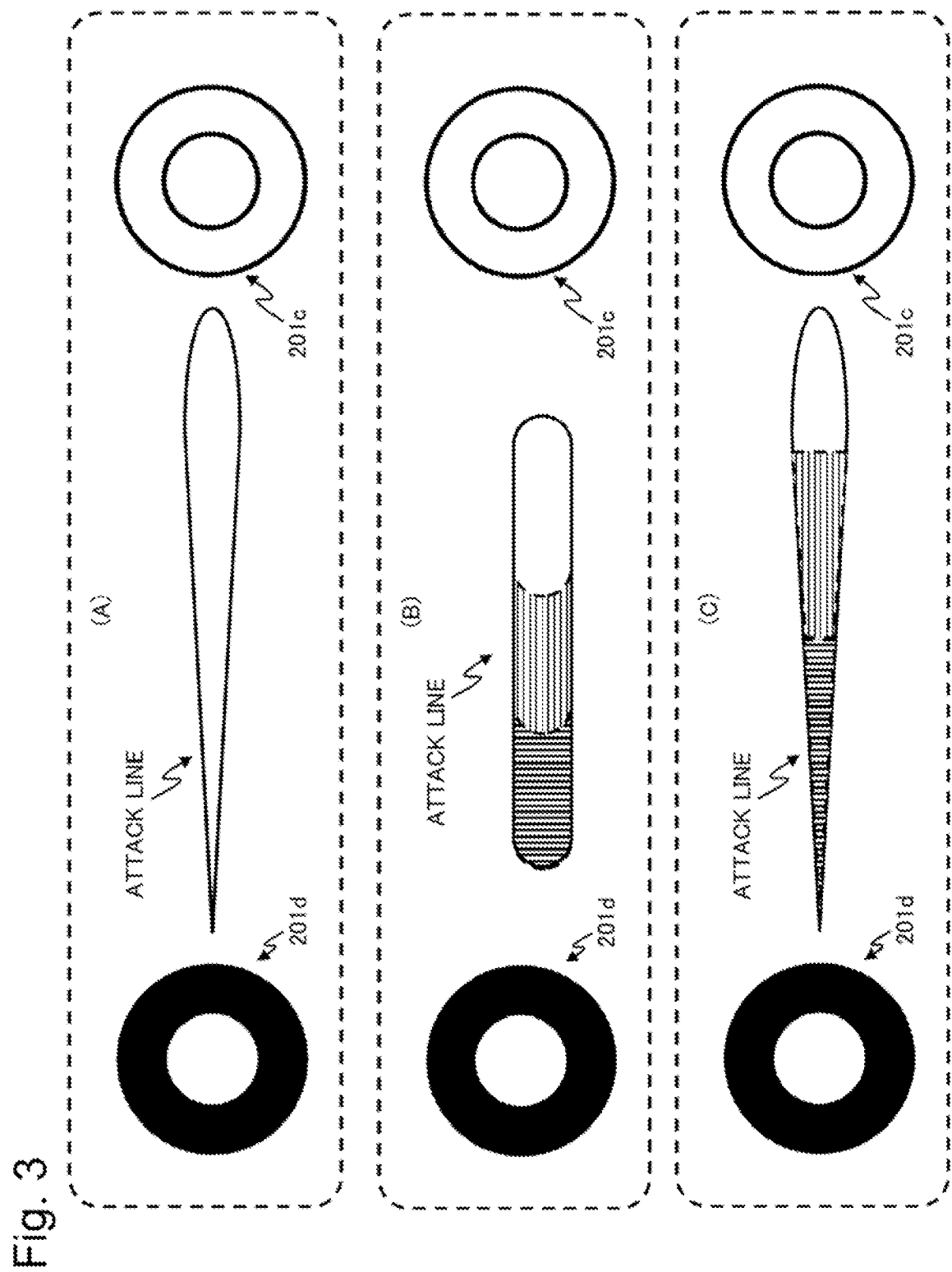
FIG. 3 is a diagram illustrating a specific example of an attack line.

While an arrow-shaped drawing element is used as an attack line in the specific example illustrated in FIG. 2, the present example embodiment is not limited thereto. In other words, a display form of an attack line is not particularly limited, and various types of display forms allowing specification of a direction of an attack (that is, a direction from a source toward a destination) may be appropriately employed. As an example, an attack line may be expressed by use of a drawing element causing at least either of a hue (or brightness) and a shape changes from the destination side to the source side. FIG. 3 illustrates specific examples of such a drawing element. In a specific example illustrated in a part (A) in FIG. 3, a shape changes from the destination side (the 201c side in FIG. 3) toward the source side (the 201d side in FIG. 3) in an attack line. In a specific example illustrated in a part (B) in FIG. 3, a hue changes from the destination side (the 201c side in FIG. 3) toward the source side (the 201d side in FIG. 3) in an attack line. In the specific example illustrated in the part (B) in FIG. 3, brightness or a pattern may change from the destination side (the 201c side in FIG. 3) toward the source side (the 201d side in FIG. 3) in the attack line. In a specific example illustrated in (C) in FIG. 3, a hue and a shape change from the destination side (the 201c side in FIG. 3) toward the source side (the 201d side in FIG. 3) in an attack line.

In the specific example in FIG. 2, the attack situation image 201e may be displayed in a display form varying according to a traffic volume between the source and the destination. As a specific example, the display information generation unit 102 may generate display information in such a way that a shape of an attack line (a size of the arrow in FIG. 2) becomes larger (enlarged) with increase in a traffic volume between the source and the destination. Similarly, the display information generation unit 102 may generate display information in such a way that the shape of the attack line (the size of the arrow in FIG. 2) becomes smaller (reduced) with decrease in a traffic volume between the source and the destination.

In the specific example in FIG. 2, the attack situation image 201e may be displayed in a display form varying according to a communication frequency between the source and the destination. As a specific example, the display information generation unit 102 may generate display information in such a way that a content of animation in the attack situation image 201e (an animation of the attack line in FIG. 2) changes according to a communication frequency between the source and the destination. For example, the display information generation unit 102 may generate display information in such a way that a speed of an animation of the attack situation image 201e (that is, a speed of dynamic change of the attack line) becomes faster with increase in a communication frequency between the source and the destination. Similarly, the display information generation unit 102 may generate display information in such a way that a speed of the animation of the attack situation image 201e becomes slower with decrease in a communication frequency between the source and the destination. Consequently, an animation image in which a moving speed of the attack line (arrow-shaped image) changes according to a change in a communication frequency between the source and the destination is displayed as the attack situation image 201e.

As another example, an image in which a changing speed of a gradation of a hue or a pattern in the attack line varies according to a change in a communication frequency may be displayed as the attack situation image 201e. As another example, an animation image in which an extending speed of the attack line varies may be displayed as the attack situation image 201e.

With a configuration as described above, a user can readily and visually recognize an attack situation between a source and a destination. For example, the user can visually recognize a scale (traffic volume) of an attack between the source and the destination from a size of the attack situation image 201e displayed on the user interface 200. For example, the user can also visually recognize a frequency (communication frequency) of an attack between the source and the destination from an animation speed of the attack situation image 201e displayed on the user interface 200.

Operation

Figure 4:
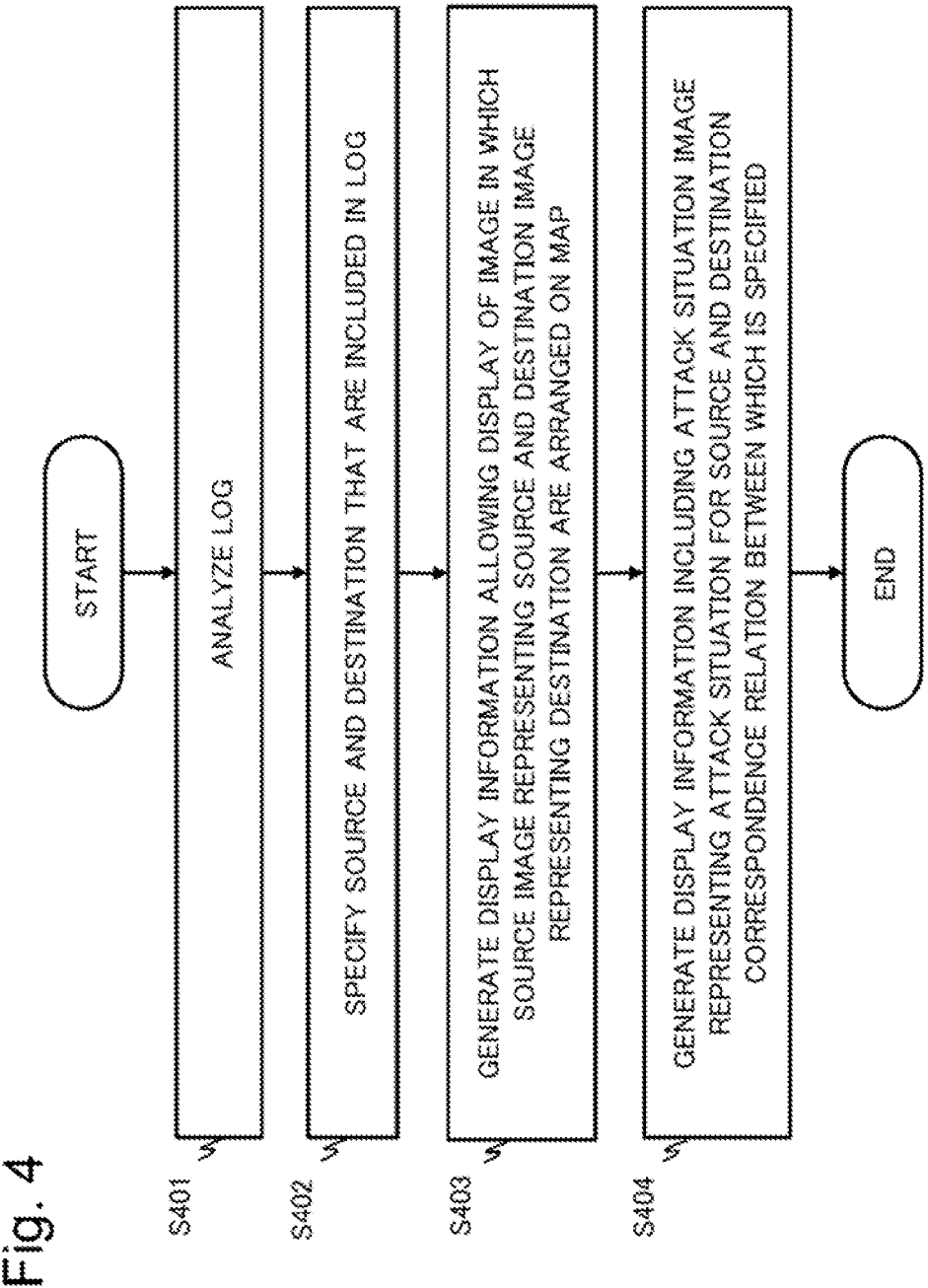
FIG. 4 is a flowchart illustrating an operation example of the attack situation visualization device according to the first example embodiment of the present disclosure.

An operation of the attack situation visualization device 100 configured as described above will be described. FIG. 4 is a flowchart illustrating an operation example of the attack situation visualization device 100.

The attack situation visualization device 100 analyzes one or more logs (Step S401). Specifically, the log analysis unit 101 in the attack situation visualization device 100 analyzes logs provided from various types of log sources.

From the log analysis result, the attack situation visualization device 100 specifies at least either of a source and a destination for one or more cyberattacks (Step S402). The attack situation visualization device 100 may be able to specify a correspondence relation between a source and a destination with respect to a cyberattack. Further, the attack situation visualization device 100 may be able to specify geographical locations where the specified source and destination are arranged.

Based on the result of the analysis in Steps S401 and S402, the attack situation visualization device 100 visualizes an attack situation related to one or more cyberattacks. Specifically, the attack situation visualization device 100 generates display information allowing display of an image in which a source image representing a source and a destination image representing a destination are respectively arranged on a map (Step S403). Further, when a correspondence relation between a source and a destination is specified for a cyberattack, the attack situation visualization device 100 generates display information including an attack situation image visualizing at least either of a traffic volume and a communication frequency that are related to the cyberattack between the source and the destination (Step S404). A specific display method of a source image, a destination image, and an attack situation image is as described above.

As an example, a case of a plurality of cyberattacks (specifically, communications related to cyberattacks) being recorded in a log for a source is assumed. In this case, for example, the attack situation visualization device 100 may generate display information successively causing display of source images for the respective cyberattacks. Similarly, as an example, a case of a plurality of cyberattacks (specifically, communications related to cyberattacks) being recorded in a log for a destination is assumed. In this case, for example, the attack situation visualization device 100 may generate display information successively causing display of destination images for the respective cyberattacks.

Similarly, when a plurality of correspondence relations between sources and destinations are specified (that is, when a plurality of cyberattacks are executed between one or more sources and one or more destinations), for example, the attack situation visualization device 100 may generate display information causing display of attack situation images in a successively changing manner for the respective cyberattacks.

The attack situation visualization device 100 according to the present example embodiment configured as described above can clearly visualize a situation of a security-related attack such as a cyberattack. The reason is as follows.

By analyzing logs provided from various types of log sources, the attack situation visualization device 100 can generate an image in which at least either of a source and a destination is displayed on a map for a cyberattack. Information allowing specification of both a source and a destination that are related to a cyberattack may not necessarily be recorded in a log provided from a log source. Even in such a situation, for example, a user of the attack situation visualization device 100 can readily and visually recognize that an event (incident) that may be related to some cyberattack is occurring at a source or a destination.

When a correspondence relation between a source and a destination related to a cyberattack is specified, the attack situation visualization device 100 can generate an image (attack situation image) visualizing an attack situation (a traffic volume and a communication frequency in particular) between the two. Consequently, for example, a user of the attack situation visualization device 100 can readily and visually recognize the situation related to the cyberattack between the source and the destination.

By using the attack situation visualization device 100 configured as described above, for example, a user can determine a severity level of a cyberattack from a frequency of the cyberattack at each source and each destination, a traffic volume and a communication frequency between each source and each destination, and the like.

Second Example Embodiment

Figure 5:
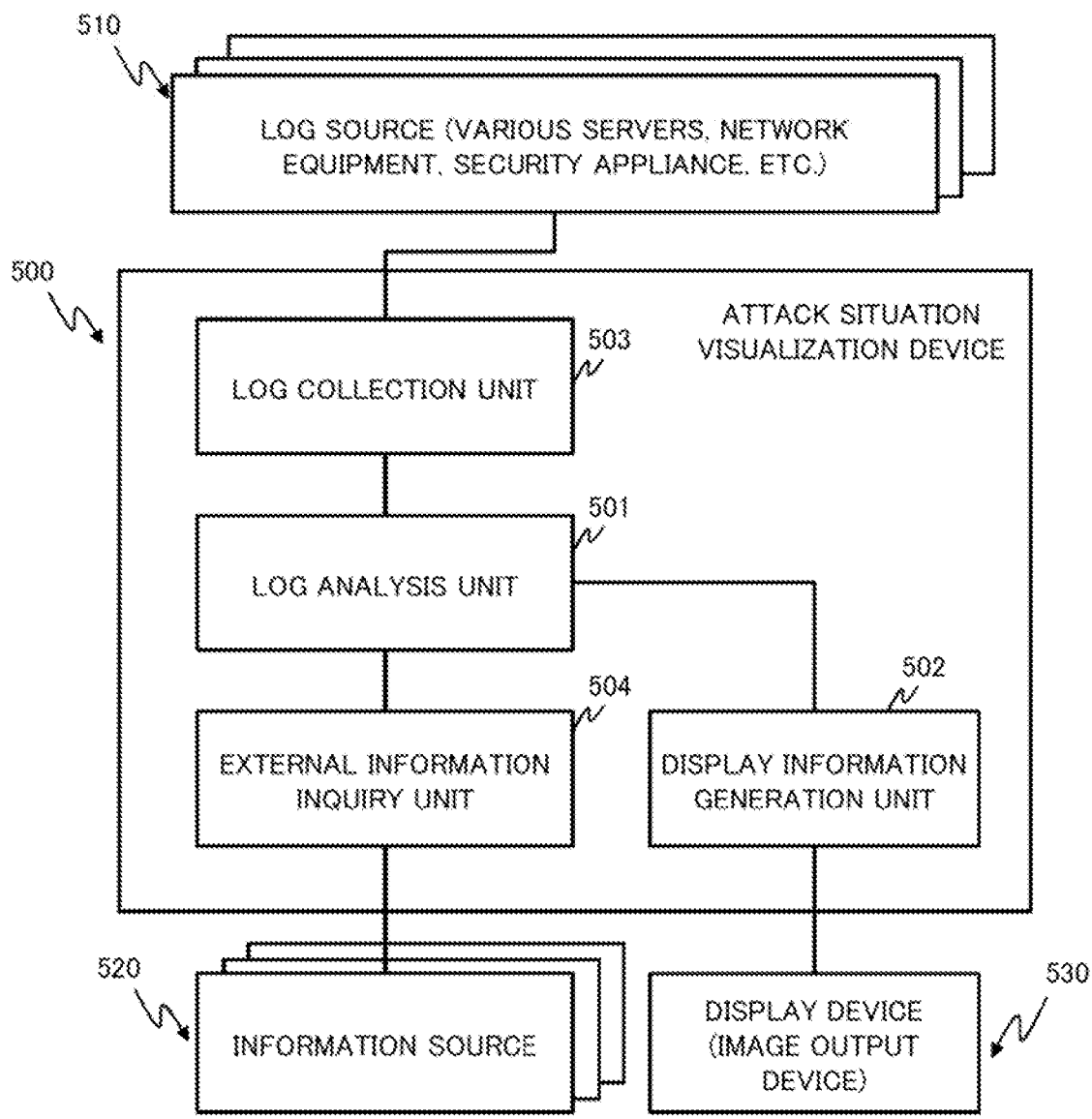
FIG. 5 is a block diagram illustrating a functional configuration of an attack situation visualization device according to a second example embodiment of the present disclosure.

A second example embodiment of the technology according to the present disclosure based on the aforementioned first example embodiment will be described below.
Configuration FIG. 5 is a block diagram illustrating a functional configuration of an attack situation visualization device 500 according to the present example embodiment. As illustrated in FIG. 5, the attack situation visualization device 500 is communicably connected to one or more log sources 510, one or more information sources 520, and a display device 530.

The log sources 510 may be various types of servers (for example, a web server, a proxy server, and a file server), may be various types of network equipment (for example, a router, a switch, and an access point), and may be various types of security equipment (for example, security appliances such as a firewall, an intrusion detection device, and an intrusion prevention device). For example, the log sources 510 may be a database and a file server that accumulate logs recorded in the aforementioned various types of systems and servers. The attack situation visualization device 500 receives a log provided from the log source 510.

For example, the information sources 520 may be various types of information providing services each being capable of providing various types of information as a response to a request (query). For example, the attack situation visualization device 500 transmits a retrieval request including security information (for example, an IP address) to the information source 520. In response to such a request, the information source 520 provides the attack situation visualization device 500 with other security information (for example, another IP address related to an IP address and information about malware executing a communication related to an IP address) related to the security information.

The information source 520 according to the present example embodiment is not particularly limited. For example, the information sources 520 may be various types of information providing services or the like each being capable of providing information about security and a communication network. As an example, the information sources 520 may include various types of external services each providing information about an IP network, such as a DNS and WHOIS. As another example, the information sources 520 may include, for example, a service providing security-related information (such as various types of vulnerability, a cyberattack, and malware) and being run by a security vendor or a security-related organization. As yet another example, the information sources 520 may include, for example, an on-line security analysis service (for example, malware inspection and malicious site (URL) inspection) run by a security vendor or the like. As yet another example, the information sources 520 may include a currently common social networking service sending out security-related information. As yet another example, the information sources 520 may include a world wide web (Web) site providing a security-related content and a database accumulating security-related information.

For example, the display device 530 is one of various types of information processing devices (such as a computer and a mobile terminal) each equipped with a display screen. For example, the display device 530 displays a situation related to a cyberattack, based on display information generated by the attack situation visualization device 500. The display device 530 may be included as part of the attack situation visualization device 500.

Functional components constituting the attack situation visualization device 500 will be described below.

As illustrated in FIG. 5, the attack situation visualization device 500 includes a log analysis unit 501, a display information generation unit 502, a log collection unit 503, and an external information inquiry unit 504. These functional components constituting the attack situation visualization device 500 may be communicably connected to one another by a suitable communication method. A connecting line between components drawn in FIG. 5 illustrates a main connection relation between the components and does not limit communication of data, a signal, control, and the like between the components.

The log collection unit 503 (log collection means) collects a log provided in the log source 510. A collection method of a log is not particularly limited and may be appropriately selected based on a configuration or the like of the log source 510. For example, the log collection unit 503 may collect a file including a log recorded in the log source 510 and may collect a log from the log source 510 by use of a specific protocol (for example, syslog).

A timing at which the log collection unit 503 collects a log from the log source 510 is not particularly limited. The log collection unit 503 may be configured to periodically collect a log, collect a log in accordance with an instruction by a user or the like, or collect a log at a specific timing.

For example, a log collected in the present example embodiment may be similar to that according to the first example embodiment. For convenience of description, it is hereinafter assumed that information about a communication that may be related to a cyberattack is recorded in a log. Further, as a specific example for description, it is hereinafter assumed that, as information indicating a source (source specification information) related to a communication and information indicating a destination (destination specification information), IP addresses of the two are used. In other words, an IP address (or other information allowing specification of the IP address) of a source related to a communication may be recorded in a log. Further, an IP address (or other information allowing specification of the IP address) of a destination related to a communication may be recorded in a log.

For example, as other information allowing specification of an IP address, a fully qualified domain name (FQDN) or a URL may be included. In this case, for example, the attack situation visualization device 500 may specify an IP address from the information by use of a DNS. Information other than the above (for example, a content of communication data and communication control) may be appropriately recorded in a log.

FIG. 8 is a diagram illustrating an example of a log collected by the log collection unit 503. FIG. 8 is a specific example for description and does not limit a log according to the present example embodiment. In the specific example illustrated in FIG. 8, a log 800 includes one or more records 801. In each record, a date and time when the record is recorded, a source IP address, a destination IP address, a destination port number, a traffic volume (a size of communication data), and the like are recorded. Each record may be assigned with a sequence number allowing specification of the record. A source IP address indicates an IP address of a source related to a communication recorded in a record. A destination IP address indicates a destination IP address related to a communication recorded in a record. In a record, only a source IP address may be recorded, only a destination IP address may be recorded, or both may be recorded.

The log analysis unit 501 is configured to analyze a log collected by the log collection unit 503. The log analysis unit 501 corresponds to the log analysis unit 101 according to the first example embodiment. A function of the log analysis unit 501 is extended from that of the log analysis unit 101 according to the first example embodiment.

Figure 6:
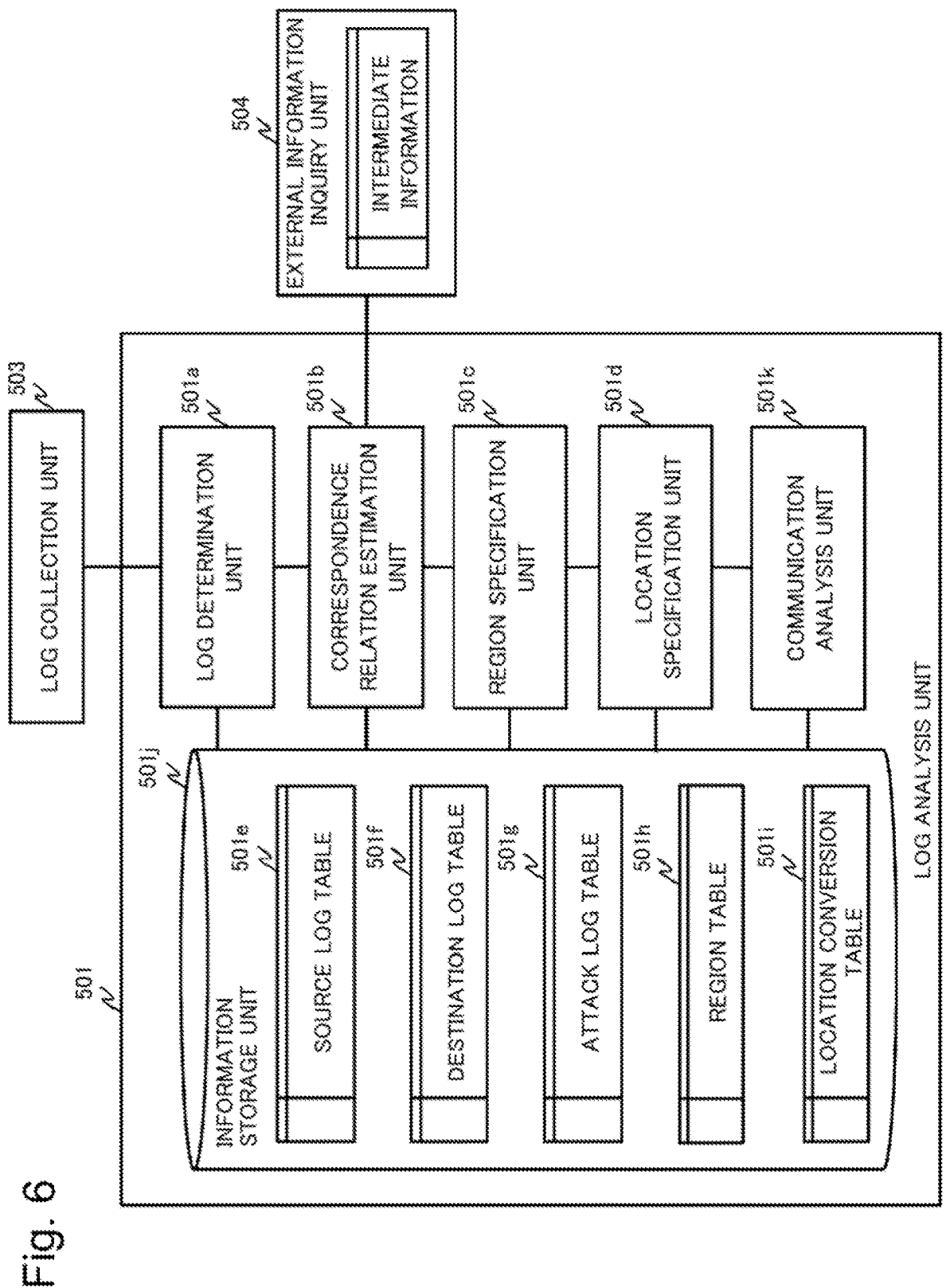
FIG. 6 is a block diagram illustrating a functional configuration of a component (log analysis unit) included in the attack situation visualization device according to the second example embodiment of the present disclosure.

As an example, as illustrated in FIG. 6, the log analysis unit 501 is configured to include a log determination unit 501a, a correspondence relation estimation unit 501b, a region specification unit 501c, a location specification unit 501d, an information storage unit 501j, and a communication analysis unit 501k. A connecting line between components drawn in FIG. 6 illustrates a main connection relation between the components and does not limit communication of data, a signal, control, and the like between the components.

The log determination unit 501a is configured to determine whether or not a source IP address is recorded and whether or not a destination IP address is recorded, in a record included in a log. For example, when a format of a record is known, the log determination unit 501a may specify a part (field) where a source IP address and a destination IP address are recorded, based on the format. Without being limited to the above, for example, the log determination unit 501a may specify a part where a source IP address (or a destination IP address) is recorded, by analyzing a record by use of pattern matching, an analysis method using a regular expression, or the like, similarly to the log analysis unit 101 according to the aforementioned first example embodiment.

When both a source IP address and a destination IP address are recorded in a record, the log determination unit 501a stores such a record into an attack log table 501g. For example, the attack log table 501g may be provided by use of a database or a file. The attack log table 501g is not limited to a table structure and may be configured to store a record by use of another suitable data structure.

When a record includes only a source IP address, the log determination unit 501a stores the record into a source log table 501e. The source log table 501e may be provided by use of a database, a file, or the like, similarly to the attack log table 501g. The source log table 501e also is not limited to a table structure and may be configured to store a record by use of another suitable data structure.

When a record includes only a destination IP address, the log determination unit 501a stores the record into a destination log table 501f. The destination log table 501f may be provided by use of a database, a file, or the like, similarly to the attack log table 501g. The destination log table 501f also is not limited to a table structure and may be configured to store a record by use of another suitable data structure.

The correspondence relation estimation unit 501b estimates relevance between a record stored in the source log table 501e within a certain period and a record stored in the destination log table 501f, by use of the external information inquiry unit 504 (to be described later). More specifically, the correspondence relation estimation unit 501b estimates a correspondence relation between a source IP address included in a record stored in the source log table 501e in a certain period and a destination IP address included in a record stored in the destination log table 501f, by use of a function of the external information inquiry unit 504. Through such processing, for example, the correspondence relation estimation unit 501b can tie (associate) a source of a communication related to a cyberattack to (with) a destination. Specific processing of estimating a correspondence relation between a source IP address and a destination IP address will be described later.

When a source IP address in a record stored in the source log table 501e is tied to a destination IP address in a record stored in the destination log table 501f, the correspondence relation estimation unit 501b integrates the records and stores an integrated record into the attack log table 501g. The record newly stored in the attack log table 501g includes at least a source IP address and a destination IP address a correspondence relation between which is specified. Such a record may further include other information included in the record in which the source IP address the correspondence relation of which is specified is recorded. Such a record may further include other information included in the record in which the destination IP address the correspondence relation of which is specified is recorded.

By referring to each record recorded in the source log table 501e, the destination log table 501f, and the attack log table 501g, the region specification unit 501c specifies a geographical region where a source having a source IP address is arranged. Similarly, the region specification unit 501c specifies a geographical location where a destination having a destination IP address is arranged. A geographical location where a source or a destination is arranged may indicate a specific point or may be expressed by a specific region (for example, a country, a city, and an area).

As an example, the region specification unit 501c may specify names of a country and a city where a source is arranged and names of a country and a city where a destination is arranged. At this time, for example, the region specification unit 501c may specify a geographical location where a host having an IP address is arranged, by use of a service such as WHOIS. The region specification unit 501c may also specify a geographical location where a host having an IP address is arranged, by referring to a region table 501h in which a correspondence relation between an IP address and information indicating a geographical location (for example, a country name and a city name) is stored.

For example, the region table 501h keeps an IP address and a location where a host having the IP address is arranged in association with one another. For example, an IP address and a location where a host having the IP address is arranged may be preregistered in the region table 501h. The region table 501h is not limited to a table structure and may be configured to keep the aforementioned correspondence relation by use of another suitable data structure. For example, the region table 501h may be provided outside the attack situation visualization device 500.

The location specification unit 501d is configured to convert information indicating a geographical location specified in the region specification unit 501c into information indicating a latitude and a longitude. Specifically, for example, from names of a country and a city where a source is arranged, the location specification unit 501d acquires a latitude and a longitude of a place where the source is arranged. Similarly, from names of a country and a city where a destination is arranged, the location specification unit 501d acquires a latitude and a longitude of a place where the source is arranged.

Specifically, by referring to a location conversion table 501i in which a correspondence relation between a geographical location, and a latitude and a longitude thereof is stored, the location specification unit 501d may specify a latitude and a longitude at which a source or a destination is arranged. For example, a correspondence relation between information indicating a geographical location (for example, a country and a city), and a latitude and a longitude indicating the location thereof may be previously registered in the location conversion table 501i. The location conversion table 501i is not limited to a table structure and may be configured to keep the aforementioned correspondence relation by use of another suitable data structure. For example, the location conversion table 501i may be provided outside the attack situation visualization device 500.

The location specification unit 501d may be configured to appropriately provide latitudes and longitudes specified for a source and a destination for the display information generation unit 502 to be described later. As an example, the location specification unit 501d may provide the display information generation unit 502 with a table associating a source IP address or a destination IP address with a specified latitude and a specified longitude. Further, the location specification unit 501d may add information indicating a latitude and a longitude to a record included in the source log table 501e, the destination log table 501f, and the attack log table 501g.

The information storage unit 501j is a storage region capable of storing various types of data. For example, the information storage unit 501j may be provided by use of one or more databases, files, and the like. For example, the information storage unit 501j may store the source log table 501e, the destination log table 501f, the attack log table 501g, the region table 501h, and the location conversion table 501i that are described above. The log analysis unit 501 may provide various types of information stored in the information storage unit 501j for the display information generation unit 502. In this case, the information storage unit 501j may be configured to be referenceable from the display information generation unit 502. The information storage unit 501j may be included in the attack situation visualization device 500 as a component separate from the log analysis unit 501.

The communication analysis unit 501k is configured to calculate a traffic volume and a communication that are frequency related to a communication by analyzing a log (more specifically, a record in a log stored in each log table), similarly to the log analysis unit 101 according to the aforementioned first example embodiment. For example, for each source IP address recorded in each log table, the communication analysis unit 501k may calculate a traffic volume and a communication frequency that are related to a communication transmitted from the source IP address. For example, for each destination IP address recorded in each log table, the communication analysis unit 501k may calculate a traffic volume and a communication frequency that are related to a communication transmitted to the destination IP address. The communication analysis unit 501k may calculate a traffic volume and a communication frequency that are related to a communication between a source IP address and a destination IP address that are recorded in a record stored in the attack log table. A specific method of calculating a traffic volume and a communication frequency that are related to a communication may be similar to that according to the first example embodiment.

The communication analysis unit 501k may be configured to provide a calculated traffic volume and a calculated communication frequency for the display information generation unit 502 to be described later. As an example, the communication analysis unit 501k may provide the display information generation unit 502 with a table associating a source IP address or a destination IP address with a calculated traffic volume and a calculated communication frequency. Further, the communication analysis unit 501k may add information indicating a traffic volume and a communication frequency to a record included in any of the source log table 501e, the destination log table 501f, and the attack log table 501g.

The external information inquiry unit 504 (external information inquiry means) is configured to execute processing of specifying a correspondence relation between a source IP address and a destination IP address that are related to a communication (a communication related to a cyberattack in particular), by use of an external information source 520. A function provided by the external information inquiry unit 504 will be described below.

The external information inquiry unit 504 receives one or more source IP addresses recorded in records stored in the source log table 501e (may be described as "source designation IP addresses") and one or more destination IP addresses recorded in records stored in the destination log table 501f (may be described as as "destination designation IP addresses"). A source designation IP address is an IP address of a source recorded in a record including only a source IP address. Further, a destination designation IP address is a destination IP address recorded in a record including only a destination IP address.

According to the present example embodiment, for example, the external information inquiry unit 504 may be provided with a source designation IP address and a destination designation IP address from the correspondence estimation unit 501b. The external information inquiry unit 504 may collect a source designation IP address and a destination designation IP address by directly referring to a record stored in the source log table 501e and a record stored in the destination log table 501f.

When a source designation IP address is provided, the external information inquiry unit 504 issues an inquiry (query) to the information source 520 with the source designation IP address as information for search (a search key). When a plurality of information sources 520 are available, the external information inquiry unit 504 may successively transmit a query to each information source 520 or may transmit a query to a plurality of information sources 520 in parallel. For example, the external information inquiry unit 504 may select one or more information sources 520 in accordance with a rule given by a setting or the like. For example, the information source 520 provides, as a response, information acquired by executing retrieval related to such an inquiry for the external information inquiry unit 504.

A response acquired from the information source 520 includes various types of information. As an example, the response may include another IP address or a URL related to a source designation IP address. The response may also include a domain name and a host name that are related to the source designation IP address. The response may also include information allowing specification of malware executing a communication related to the source designation IP address. The response may also include information indicating vulnerability related to the source designation IP address.

The external information inquiry unit 504 analyzes a response provided from the information source 520. Specifically, when the response includes text data, the external information inquiry unit 504 may analyze the response by executing various types of character string analysis processing, pattern matching processing, and the like on such text data. Further, when the response includes binary data, the external information inquiry unit 504 may analyze the response by executing various types of binary analysis (format analysis), pattern matching on a binary, and the like. A specific method of analyzing text data and binary data may be appropriately selected including a known technology.

The external information inquiry unit 504 stores various types of data included in the response as intermediate information. For example, such intermediate information may include an IP address, a specimen name of malware, a host name, a domain name, and a URL that are included in the response.

The external information inquiry unit 504 checks whether or not information stored as intermediate information includes a destination designation IP address provided from the correspondence relation estimation unit 501b. For example, the external information inquiry unit 504 may determine whether or not an IP address matching a destination designation IP address provided from the correspondence relation estimation unit 501b is stored as intermediate information.

When an IP address matching the destination designation IP address is not included in the intermediate information, the external information inquiry unit 504 transmits an inquiry (query) to the information source 520 again, using the intermediate information as information for search (a search key). The external information inquiry unit 504 may repeatedly execute the aforementioned processing until an IP address matching the destination designation IP address provided from the correspondence relation estimation unit 501b is acquired. When an IP address matching the provided destination designation IP address is not acquired, the external information inquiry unit 504 may abort the aforementioned processing at a specific count. For example, such a specific count may be predetermined by a setting or the like. In this case, the external information inquiry unit 504 may notify the correspondence relation estimation unit 501b that a correspondence relation between the source designation IP address and the destination designation IP address is not specified.

When an IP address matching the destination designation IP address is acquired as intermediate information through the aforementioned processing, the external information inquiry unit 504 provides the correspondence relation estimation unit 501b with information tying (associating) the destination designation IP address to (with) the source designation IP address used as the query. For example, the external information inquiry unit 504 may execute the aforementioned processing on every source designation IP address provided from the correspondence relation estimation unit 501b and provide the result for the correspondence relation estimation unit 501b.

The external information inquiry unit 504 may also issue an inquiry (query) to the information source 520 with a destination designation IP address as information for search (a search key). In this case, the external information inquiry unit 504 may execute processing similar to the above, by using a destination designation IP address in place of a source designation IP address as information for search (a search key). The external information inquiry unit 504 may check whether or not intermediate information acquired by analyzing a response acquired from the information source 520 includes information matching the source designation IP address.

When an IP address matching the source designation IP address is not acquired as intermediate information through the aforementioned processing, the external information inquiry unit 504 may notify the correspondence relation estimation unit 501b that a source designation IP address related to the destination designation IP address is not specified. When an IP address matching the source designation IP address is acquired as intermediate information through the aforementioned processing, the external information inquiry unit 504 may provide the correspondence relation estimation unit 501b with information tying (associating) the source designation IP address to (with) the destination designation IP address used as the query. For example, the external information inquiry unit 504 may execute the aforementioned processing on every destination designation IP address provided from the correspondence relation estimation unit 501b and provide the result for the correspondence relation estimation unit 501b.

Through the processing as described above, for example, starting from a record including only a source IP address, the external information inquiry unit 504 can specify a destination IP address being related to the source IP address and being recorded in another record. Similarly, starting from a record including only a destination IP address, the external information inquiry unit 504 can specify a source IP address being related to the destination IP address and being recorded in another record. Consequently, the external information inquiry unit 504 can specify a correspondence relation between a source IP address and a destination IP address, based on a log including only either of the source IP address and the destination IP address.

When a correspondence relation between a source IP address and a destination IP address that are provided from the correspondence relation estimation unit 501b can be specified, the external information inquiry unit 504 may provide the correspondence relation estimation unit 501*b* with a confidence level of the correspondence relation.

For example, when a one-way correspondence relation holds between a source IP address and a destination IP address, the external information inquiry unit 504 may set a confidence level (first confidence level) indicating a one-way correspondence relation to the IP addresses. The one-way correspondence relation refers to a correspondence relation between a source IP address and a destination IP address in a case that the destination IP address can be specified from the source IP address but the original source IP address cannot be specified from the destination IP address (or vice versa).

For example, when a two-way correspondence relation holds between a source IP address and a destination IP address, the external information inquiry unit 504 may set a confidence level (second confidence level) indicating a two-way correspondence relation to the IP addresses. The two-way correspondence relation refers to a correspondence relation between a source IP address and a destination IP address in a case that the destination IP address can be specified from the source IP address and also the original source IP address can be specified from the destination IP address. In this case, a value greater than a confidence level indicating the one-way correspondence relation may be set to a confidence level indicating the two-way correspondence relation.

Figure 9:
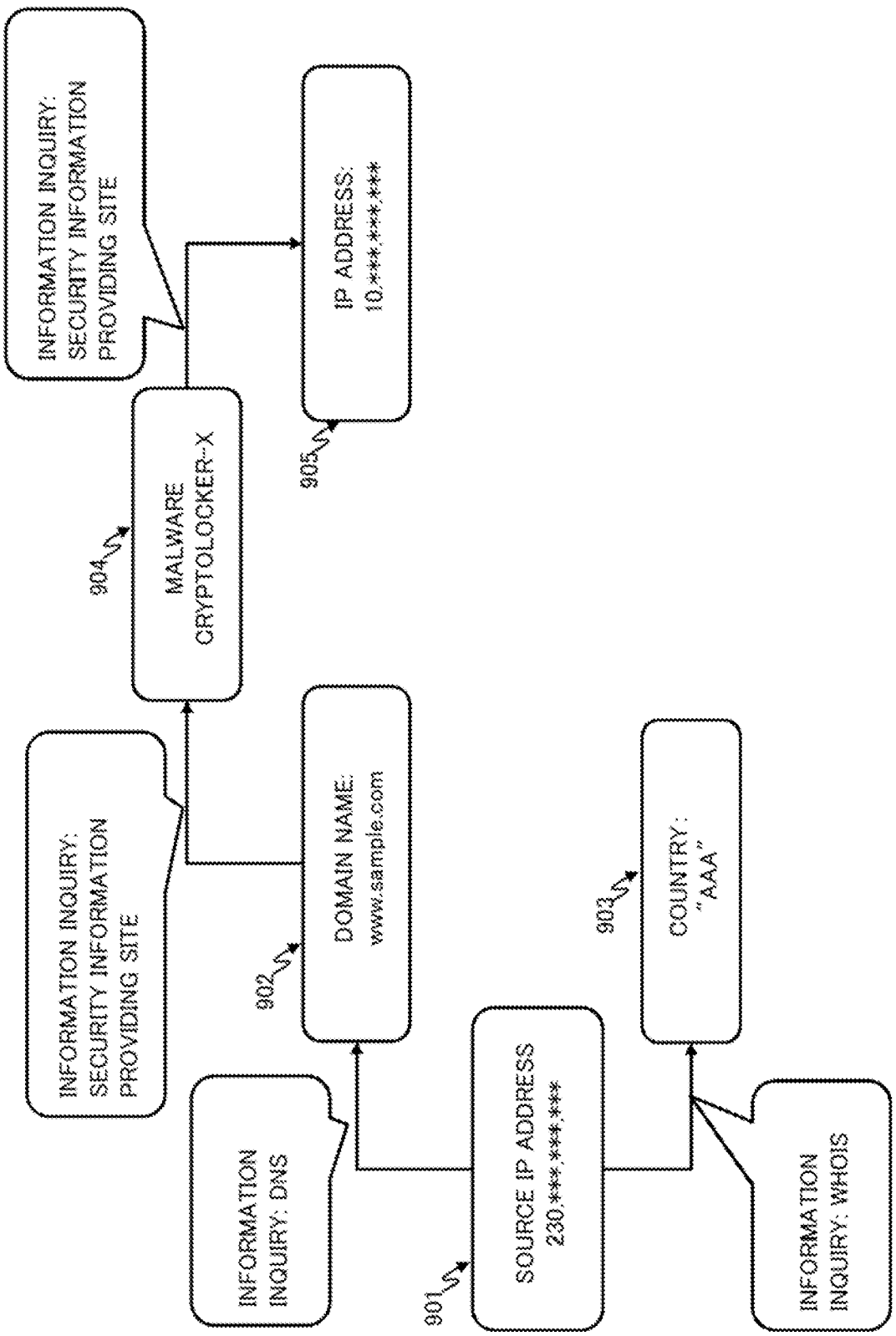
FIG. 9 is a diagram illustrating a specific example of a process of specifying a destination IP address from a source IP address.

A function of specifying a correspondence relation between a source IP address and a destination IP address will be described below by use of a specific example illustrated in FIG. 9. In the specific example illustrated in FIG. 9, a source IP address (901 in FIG. 9) is provided for the external information inquiry unit 504.

The external information inquiry unit 504 acquires information about the source IP address 901 from an information source 520 (DNS and WHOIS). Consequently, for example, a domain name (902 in FIG. 9) and country information (903 in FIG. 9) are acquired as intermediate information. The intermediate information does not include a destination IP address. Accordingly, the external information inquiry unit 504 further acquires information about the domain name 902 from an information source 520 (for example, a security information providing site). Consequently, information about malware (904 in FIG. 9) is acquired as intermediate information. The intermediate information does not include a destination IP address. Consequently, the external information inquiry unit 504 further acquires information about the malware 904 from an information source 520 (for example, a security information providing site). Consequently, for example, an IP address (905 in FIG. 9) is acquired as intermediate information. The information source 520 determines whether the acquired IP address 905 is included in one or more destination IP addresses provided by the correspondence relation estimation unit 501*b* and provides the result for the correspondence relation estimation unit 501*b*. The external information inquiry unit 504 can execute mostly similar processing when a destination IP address is provided in place of a source IP address 901. Consequently, the external information inquiry unit 504 determines whether an IP address acquired based on a destination IP address is included in one or more source IP addresses provided by the correspondence relation estimation unit 501*b* and provides the result for the correspondence relation estimation unit 501*b*.

The display information generation unit 502 generates display information causing display of a display image in which one or more of a source image representing a source, a destination image representing a destination, and an image representing a situation of a cyberattack between a source and a destination are arranged on a map. The display information generation unit 502 corresponds to the display information generation unit 102 according to the first example embodiment. A function of the display information generation unit 502 is extended from that of the display information generation unit 102 according to the first example embodiment.

Figure 7:
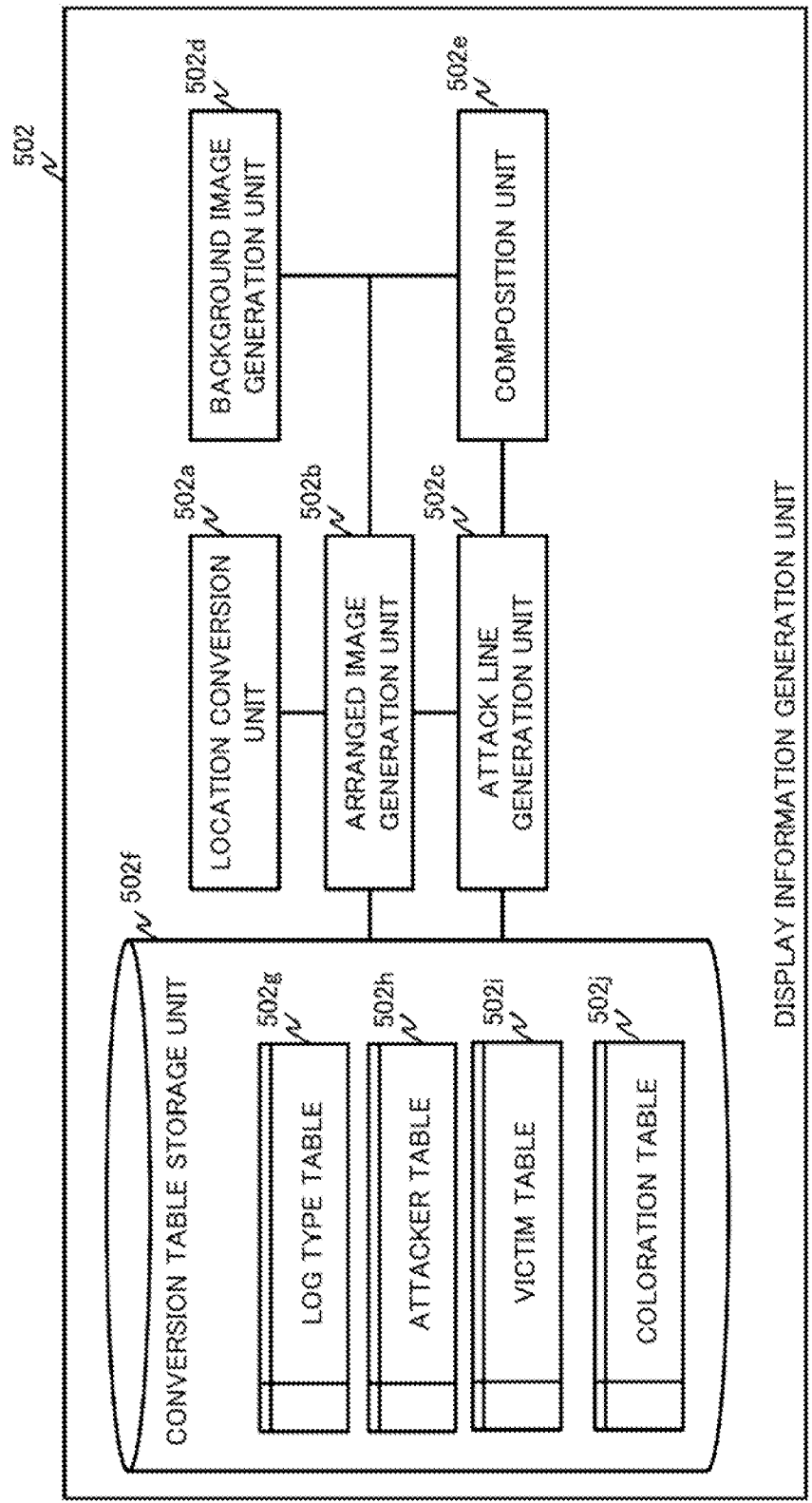
FIG. 7 is a block diagram illustrating a functional configuration of another component (display information generation unit) included in the attack situation visualization device according to the second example embodiment of the present disclosure.

As an example, the display information generation unit 502 is configured to include a location conversion unit 502*a*, an arranged image generation unit 502*b*, an attack line generation unit 502*c*, a background image generation unit 502*d*, and a composition unit 502*e*, as illustrated in FIG. 7. The display information generation unit 502 may be configured to include a conversion table storage unit 502*f*. These components included in the display information generation unit 502 may be appropriately and communicably connected to one another. A connecting line between components drawn in FIG. 7 illustrates a main connection relation between the components and does not limit communication of data, a signal, control, and the like between the components.

The display information generation unit 502 may appropriately specify a record for generating display information, out of records stored in each log table (the source log table 501*e*, the destination log table 501*f*, and the attack log table 501*g*). The display information generation unit 502 may select every record recorded in each log table as records for generating display information or may select part of the records. As an example, a record recorded within a specific time range may be selected as a log for generating display information.

The location conversion unit 502*a* calculates positions to be displayed on a display image (on a map included in the display image in particular) for a source and a destination that are recorded in each log table. Specifically, the location conversion unit 502*a* converts latitudes and longitudes of the source and the destination, the latitudes and the longitudes being specified by the log analysis unit 501 (the location specification unit 501*d* in particular), into coordinates on the display image. A known technology may be used as a method of converting a latitude and a longitude into coordinates on a planar map (for example, a map drawn on Mercator's projection).

The arranged image generation unit 502*b* generates arranged image information indicating a source image representing a source to be displayed on a display image and a destination image representing a destination to be displayed on the display image. Such arranged image information may be information constituting part of the display information. Specifically, the arranged image information may be image data representing a source image and a destination image themselves or may be various types of data used in generation of the display image. For convenience of description, the arranged image generation unit 502*b* generating image arrangement information allowing display of a source image may be hereinafter simply described as "the arranged image generation unit 502*b* generating a source image." Further, the arranged image generation unit 502*b* generating image arrangement information allowing display of a destination image may be simply described as "the arranged image generation unit 502*b* generating a destination image."

A source image is an image representing a source of a cyberattack, similarly to the aforementioned first example embodiment. More specifically, a source image is an image representing a source specified by a source IP address recorded in a record included in the source log table 501*e* and the attack log table 501*g*. A destination image is an image representing a destination of a cyberattack, similarly to the aforementioned first example embodiment. More specifically, a destination image is an image representing a destination specified by a destination IP address recorded in a record included in the destination log table 501*f* and the attack log table 501*g*.

When only a source related to a communication is specified, the arranged image generation unit 502*b* generates arranged image information allowing display of a first source image representing the source. More specifically, the arranged image generation unit 502*b* generates arranged image information allowing display of a first source image for a source specified by a source IP address recorded in a record included only in the source log table 501*e*.

When both a source and a destination that are related to a communication are specified, the arranged image generation unit 502*b* generates arranged image information allowing display of a second source image representing the source. More specifically, the arranged image generation unit 502*b* generates arranged image information allowing display of a second source image for a source specified by a source IP address recorded in a record included in the attack log table 501*g*. A first source image and a second source image may be different images.

When only a destination related to a communication is specified, the arranged image generation unit 502*b* generates arranged image information allowing display of a first destination image representing the destination. More specifically, the arranged image generation unit 502*b* generates arranged image information allowing display of a first destination image for a destination specified by a destination IP address recorded in a record included only in the destination log table 501*f*.

When both a source and a destination that are related to a communication are specified, the arranged image generation unit 502*b* generates arranged image information allowing display of a second destination image representing the destination. More specifically, the arranged image generation unit 502*b* generates arranged image information allowing display of a second destination image for a destination specified by a destination IP address recorded in a record included in the attack log table 501*g*. A first destination image and a second destination image may be different images.

A first destination image, a second destination image, a first source image, and a second source image have only to be able to be displayed in forms distinguishable to a user and are not particularly limited to specific display forms. Specifically, the arranged image generation unit 502*b* may appropriately generate images differing in at least one of display forms such as a shape, a hue, a pattern, and an animation method, as a first destination image, a second destination image, a first source image, and a second source image.

In summary, the arranged image generation unit 502*b* generates different source images and different destination images, depending on a type in which a record is included (hereinafter described as a "log type"). A log type of a record including only a destination IP address (that is, a record stored in the destination log table 501*f*) may be hereinafter described as a "log type A." Further, a log type of a record including only a source IP address (that is, a record stored in the source log table 501*e*) may be described as a "log type B." Further, a log type of a record including both a source and a destination may be described as a "log type C." For example, the log types may be stored in a log type table 502*g* in a format as illustrated in FIG. 11.

Figure 10:
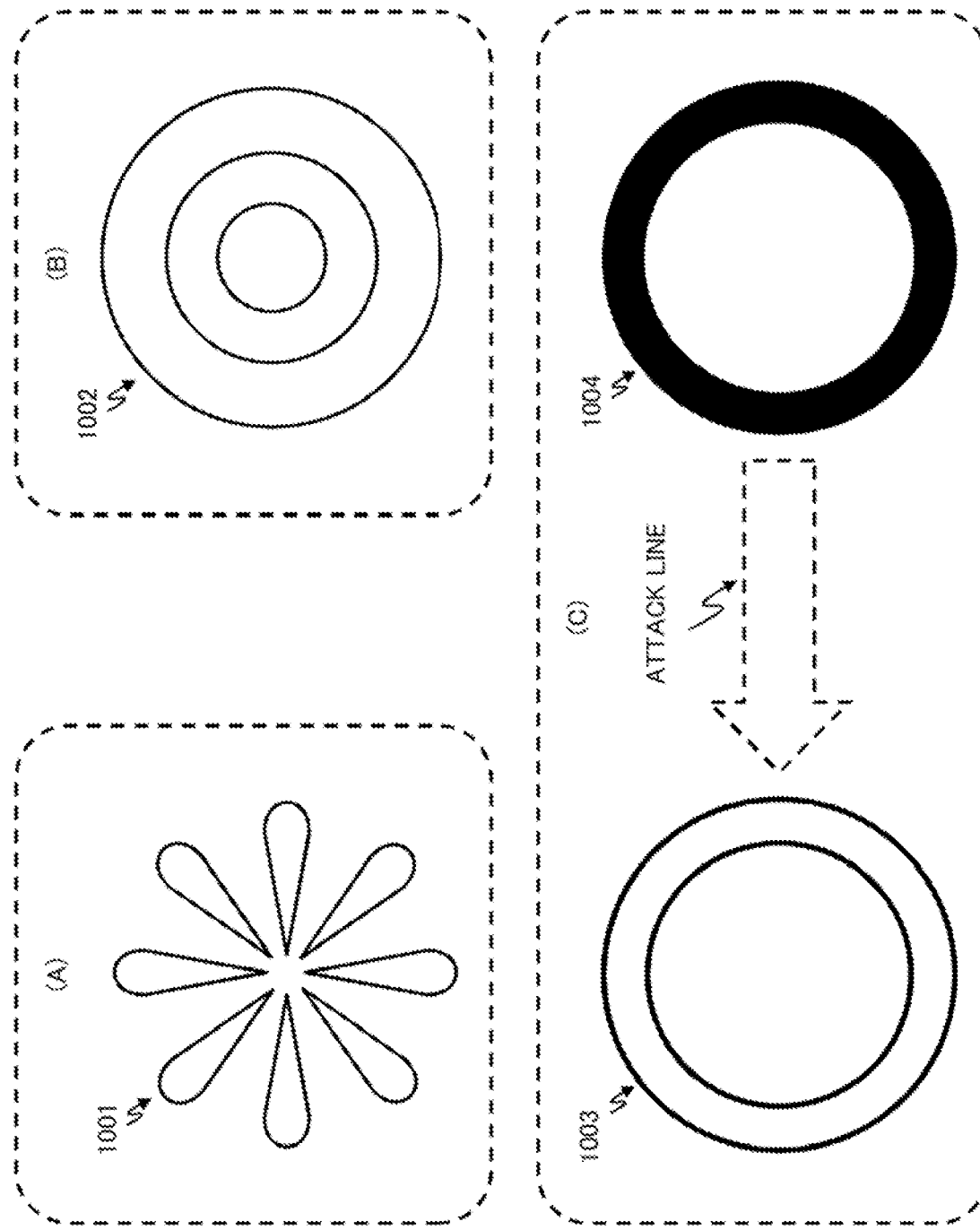
FIG. 10 is a diagram illustrating specific examples of a source display image and a destination display image.

A source image and a destination image that are generated by the arranged image generation unit 502*b* will be described by use of a specific example illustrated in FIG. 10. FIG. 10 is a specific example for description and does not limit the present example embodiment.

For example, the arranged image generation unit 502*b* may generate a first destination image 1001 as a first destination image for the log type A, as illustrated in a part (A) in FIG. 10. For example, the arranged image generation unit 502*b* may generate a first source image 1002 as a first source image for the log type B, as illustrated in part (B) in FIG. 10. For example, the arranged image generation unit 502*b* may generate a second destination image 1003 as a second destination image for the log type C. For example, the arranged image generation unit 502*b* may generate a second source image 1004 as a second source image for the log type C. In the specific example illustrated in FIG. 10, the arranged image generation unit 502*b* generates images in different display forms (a shape and a hue in FIG. 10) for the first destination image 1001, the second destination image 1003, the first source image 1002, and the second source image 1004.

Without being limited to the specific example illustrated in FIG. 10, the arranged image generation unit 502*b* may appropriately generate images differing in a shape, a hue, a pattern, an animation method, or the like. As an example, the arranged image generation unit 502*b* may display an animation image in which drawn lines radiate (for example, ripple out) around a point on a map where a source or a destination is arranged, as the first destination image 1001, the second destination image 1003, the first source image 1002, and the second source image 1004. In this case, for example, the arranged image generation unit 502*b* may change a shape, a pattern, a hue, an animation speed, and the like of a drawn line for each of the first destination image 1001, the second destination image 1003, the first source image 1002, and the second source image 1004.

Through the processing as described above, for example, the arranged image generation unit 502*b* can generate images allowing a user to readily distinguish between a cyberattack only a source of which is specified, a cyberattack only a destination of which is specified, and a cyberattack a source and a destination of which are associated to one another.

The arranged image generation unit 502*b* may also generate display information causing a display form of a source image (a first source image and a second source image) representing a source to change according to a traffic volume and a communication frequency that are related to a communication transmitted from the source. Similarly, the arranged image generation unit 502*b* may generate display information causing a display form (such as a shape, a hue, a pattern, and an animation method) of a destination image (a first destination image and a second destination image) representing a destination to change according to a traffic volume and a communication frequency that are related to a communication transmitted to the destination. For example, a traffic volume and a communication frequency that are related to a source or a destination may be provided from the communication analysis unit 501*k* or may be calculated by the arranged image generation unit 502*b* from records stored in various types of log tables.

As an example, the arranged image generation unit 502*b* may change a size (dimensions) of a source image (a first source image and a second source image) representing a source according to a traffic volume related to a communication transmitted from the source. In this case, for example, the arranged image generation unit 502b may cause a size of the source image to change in proportion to the traffic volume. For example, the arranged image generation unit 502b may change a size of a destination image (a first destination image and a second destination image) representing a destination, according to a traffic volume related to a communication transmitted to the destination. In this case, for example, the arranged image generation unit 502b may cause a size of the destination image to change in proportion to the traffic volume. In the case described above, a traffic volume related to a source and a destination may be a total traffic volume related to a specific communication at the source or the destination.

It is assumed as an example that each of a source image and a destination image is an animation image in which a shape, a hue, a pattern, and the like dynamically change. In this case, the arranged image generation unit 502b may change an animation speed of a source image (a first source image and a second source image) representing a source, according to a communication frequency related to a communication transmitted from the source. For example, the arranged image generation unit 502b may cause an animation speed of the source image to change in proportion to the communication frequency. For example, the arranged image generation unit 502b may change an animation speed of a destination image (a first destination image and a second destination image) representing a destination, according to a communication frequency related to a communication transmitted to the destination. For example, the arranged image generation unit 502b may cause an animation speed of the destination image to change in proportion to the communication frequency.

As an example, the arranged image generation unit 502b may change a hue of a source image (a first source image and a second source image) representing a source, according to an attacker to which the source belongs. Specifically, for example, the arranged image generation unit 502b refers to an attacker table 502h as illustrated in FIG. 12 and specifies an attacker to which a source belongs from a source IP address and a destination port number that are recorded in a record stored in each log table. For example, the attacker table 502h is a conversion table allowing specification of an attacker (for example, a name of an attacker or an identifier for specifying the attacker) from a source IP address and a destination port number. For example, the arranged image generation unit 502b may refer to a coloration table 502j as illustrated in FIG. 14 and specify coloration allocated to an attacker to which a source belongs.

Similarly, the arranged image generation unit 502b may change a hue of a destination image (a first destination image and a second destination image) representing a destination, according to a victim to which the destination belongs. For example, the arranged image generation unit 502b may refer to a victim table 502i as illustrated in FIG. 13 and specify a victim (for example, a name of a victim or an identifier for specifying the victim) to which the destination belongs, from a destination IP address recorded in a record stored in each log table. For example, the victim table 502i is a conversion table allowing specification of a victim from a destination IP address. For example, the arranged image generation unit 502b refers to the coloration table 502j as illustrated in FIG. 14 and specifies coloration allocated to a victim to which a destination belongs.

By use of coloration specified as described above, the arranged image generation unit 502b may change hues of a source image (a first source image and a second source image) and a destination image (a first destination image and a second destination image). Without being limited to the above, the arranged image generation unit 502b may change a pattern of a source image according to an attacker to which the source belongs and may change a pattern of a destination image according to a victim to which the destination belongs.

Required data may be previously set to the attacker table 502h, the victim table 502i, and the coloration table 502j. Without being limited to the specific example in FIG. 12, a plurality of sets of a source IP address and a destination port number may be associated with one attacker in the attacker table 502h. Similarly, a plurality of destination IP addresses may be associated with one victim in the victim table 502i.

FIG. 15 to FIG. 18 illustrate specific examples of a first destination image, a second destination image, a first source image, and a second source image that are generated by the arranged image generation unit 502b.

Figure 15:
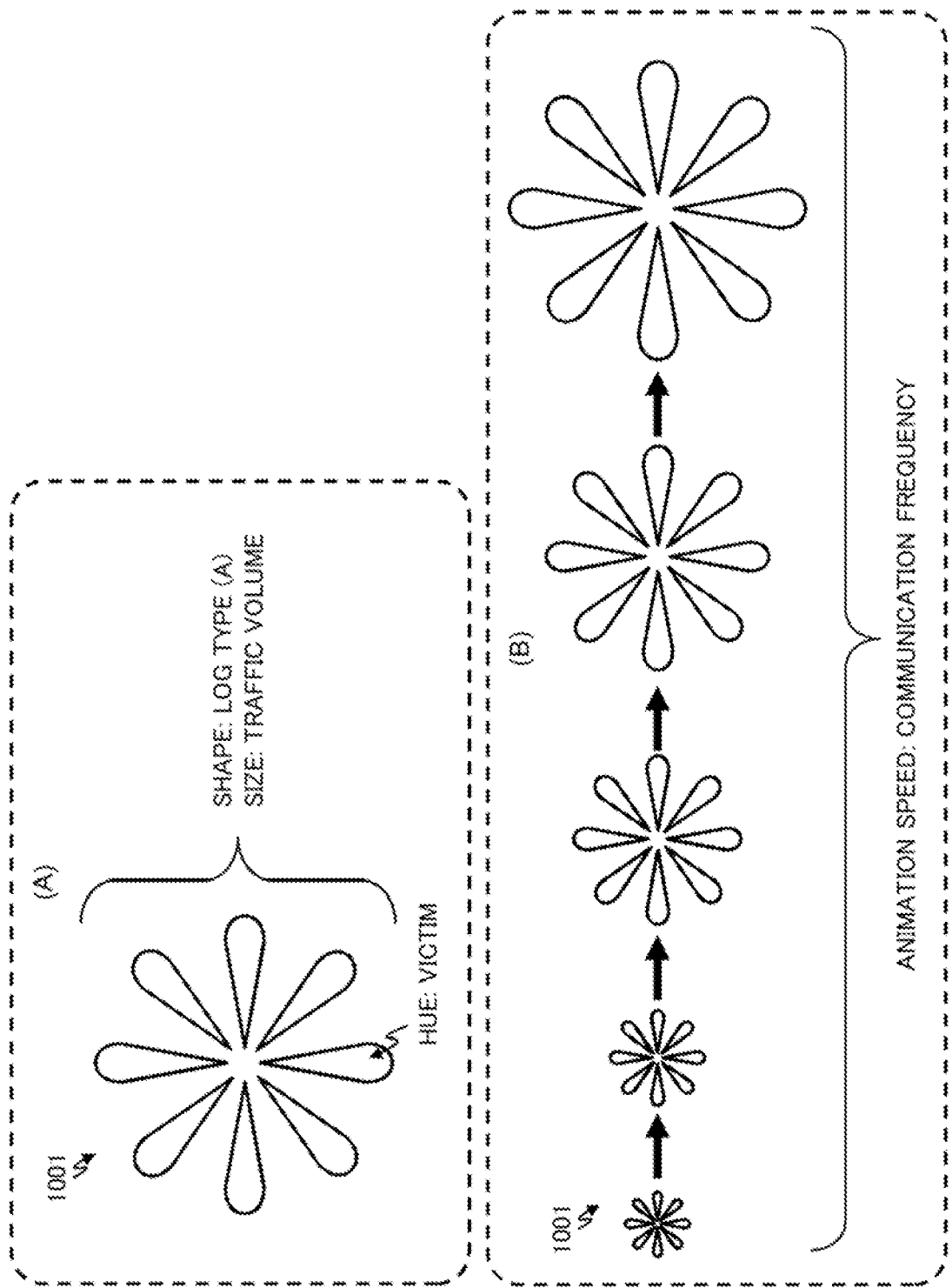
FIG. 15 is a diagram illustrating a display form of a destination image.

As illustrated in FIG. 15, a size of a first destination image 1001 represents a traffic volume transmitted to a destination, and a hue of the image represents a victim to which the destination belongs [a part (A) in FIG. 15]. Further, when the first destination image 1001 is an animation image, an animation speed of the image represents a communication frequency [a part (B) in FIG. 15].

Figure 16:
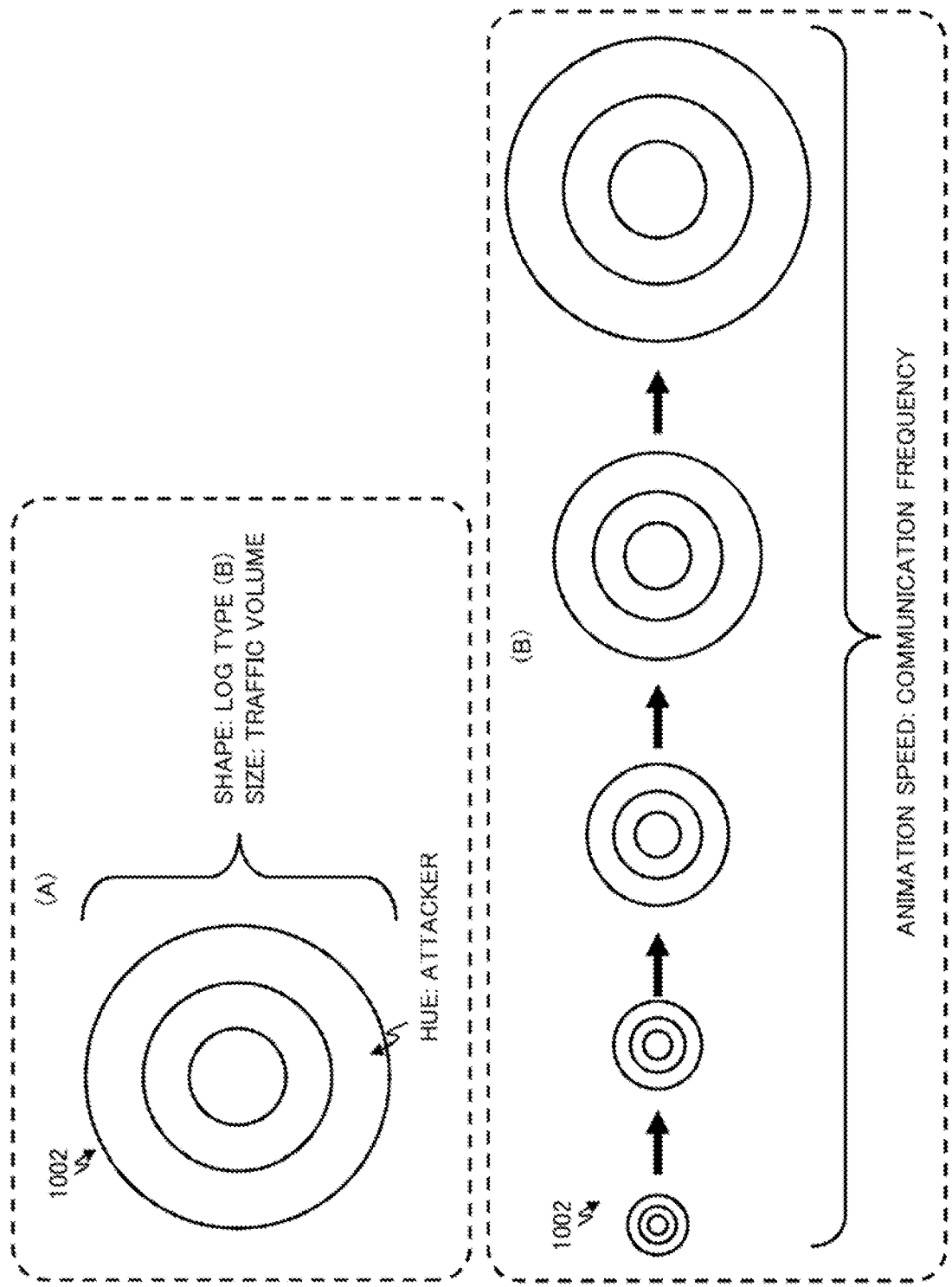
FIG. 16 is a diagram illustrating a display form of a source image.

As illustrated in FIG. 16, a size of a first source image 1002 represents a traffic volume transmitted from a source, and a hue of the image represents an attacker to which the source belongs [a part (A) in FIG. 16]. Further, when the first source image 1002 is an animation image, an animation speed of the image represents a communication frequency [a part (B) in FIG. 16].

Figure 17:
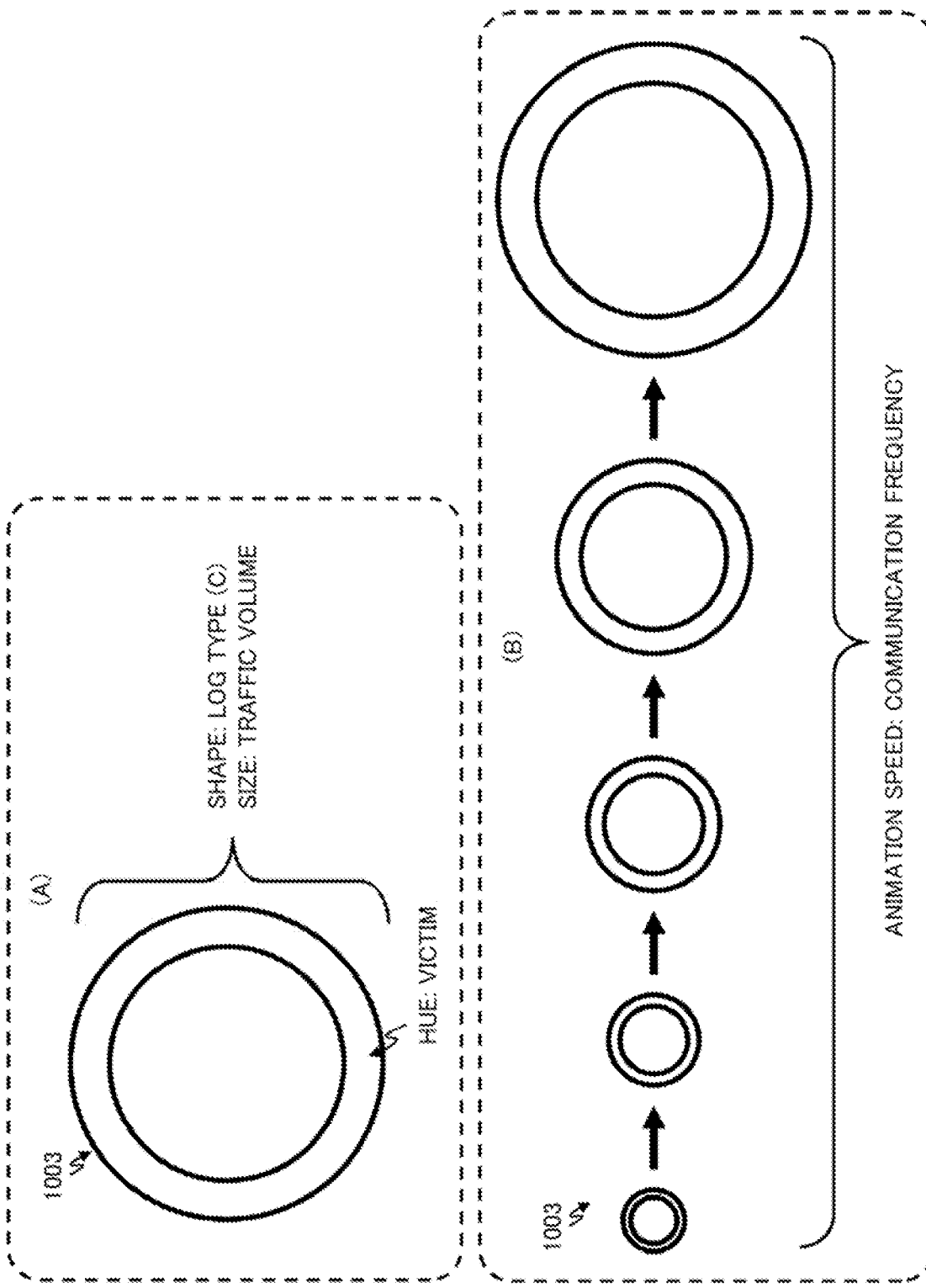
FIG. 17 is a diagram illustrating another display form of a destination image.

As illustrated in FIG. 17, a size of a second destination image 1003 represents a traffic volume transmitted to a destination, and a hue of the image represents a victim to which the destination belongs [a part (A) in FIG. 17]. Further, when the second destination image 1003 is an animation image, an animation speed of the image represents a communication frequency [a part (B) in FIG. 17].

Figure 18:
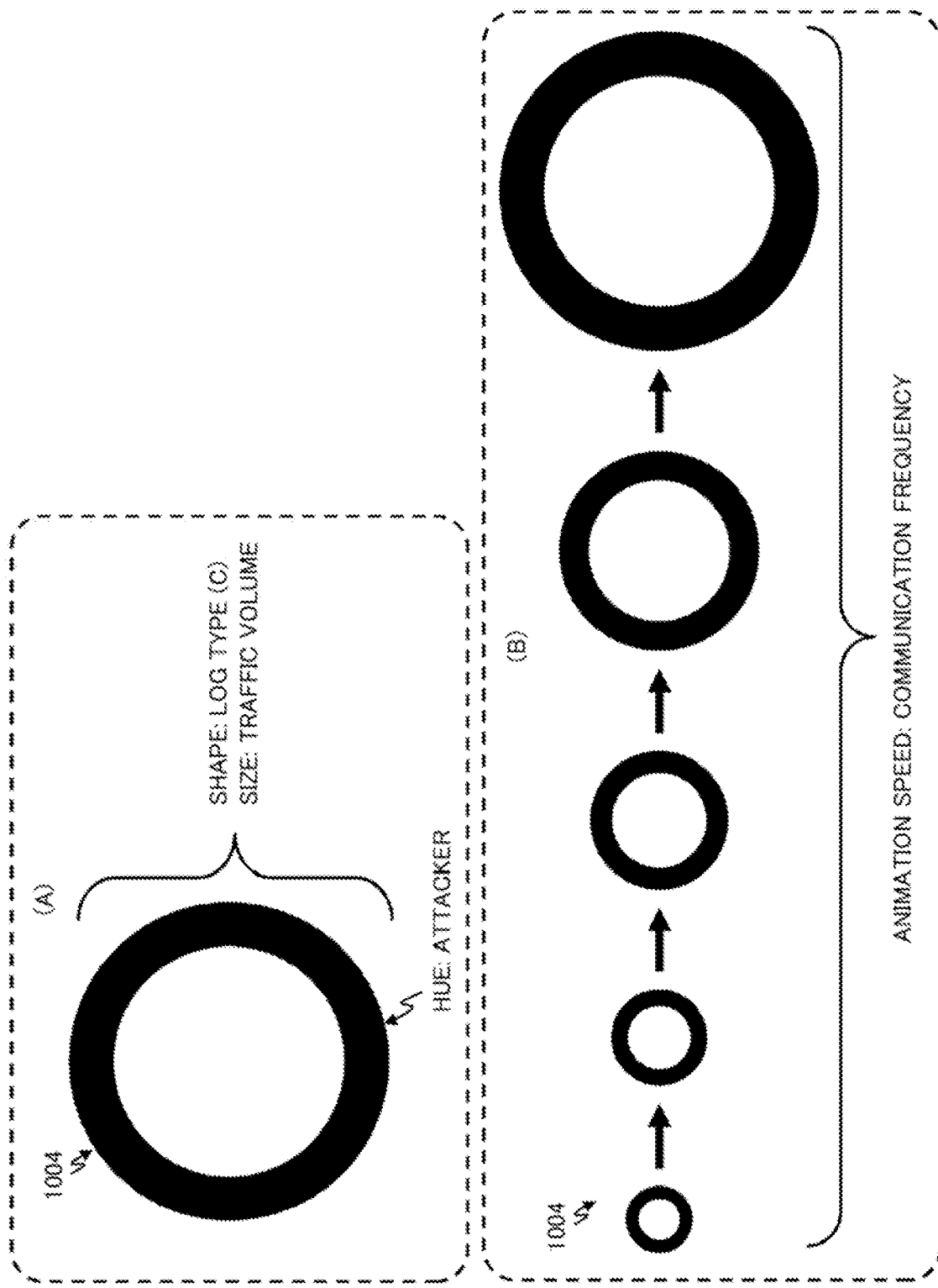
FIG. 18 is a diagram illustrating another display form of a source image.

As illustrated in FIG. 18, a size of a second source image 1004 represents a traffic volume transmitted from a source, and a hue of the image represents an attacker to which the source belongs [a part (A) in FIG. 18]. Further, when the second source image 1004 is an animation image, an animation speed of the image represents a communication frequency [a part (B) in FIG. 18].

Through the processing as described above, for example, the arranged image generation unit 502b can generate a source image allowing a user to readily recognize a traffic volume related to a source and an attacker to which the source belongs. Further, the arranged image generation unit 502b can also generate a source image allowing a user to readily recognize a communication frequency related to a source.

Further, through the processing as described above, for example, the arranged image generation unit 502b can generate a destination image allowing a user to readily recognize a traffic volume related to a destination and a victim to which the destination belongs. Further, the arranged image generation unit 502b can also generate a destination image allowing a user to readily recognize a communication frequency related to a destination.

The attack line generation unit 502c generates an attack situation image representing an attack directed from a source to a destination, similarly to the display information generation unit 102 according to the first example embodiment.

It is hereinafter assumed that the attack line generation unit 502c generates an animation image in which a display form of an attack line dynamically changes, as an attack situation image.

For example, the attack line generation unit 502c is configured to change a display form (for example, a shape, a hue, a pattern, and an animation method) of an attack line according to a traffic volume and a communication frequency that are related to a communication executed between the same source and the same destination in a certain period. For example, a traffic volume and a communication frequency that are related to a source or a destination may be provided from the communication analysis unit 501k or may be calculated by the attack line generation unit 502c from records stored in various types of log tables.

The attack line generation unit 502c may generate an attack situation image including an attack line by a method similar to that by the display information generation unit 102 according to the first example embodiment.

As an example, the attack line generation unit 502c may change a size (such as dimensions, a length, and a thickness) of an attack line, according to a traffic volume related to a communication executed between a source and a destination in a certain period. When the attack line is expressed as a line (such as a straight line, a curve, or an arrow) linking the source and the destination, for example, the attack line generation unit 502c may cause a thickness of such a line to increase (or decrease) in proportion to a traffic volume.

As an example, the attack line generation unit 502c may change an animation speed of an attack line, according to a communication frequency related to a communication executed between a source and a destination in a certain period. For example, the attack line generation unit 502c may cause an animation speed of a line extending from the source to the destination to increase (or decrease) in proportion to the communication frequency.

The attack line generation unit 502c may also change a hue of an attack line according to a destination port number recorded in a record stored in the attack log table 501g. For example, the attack line generation unit 502c may refer to the coloration table 502j as illustrated in FIG. 14 and specify coloration allocated for each destination port number.

Figure 19:
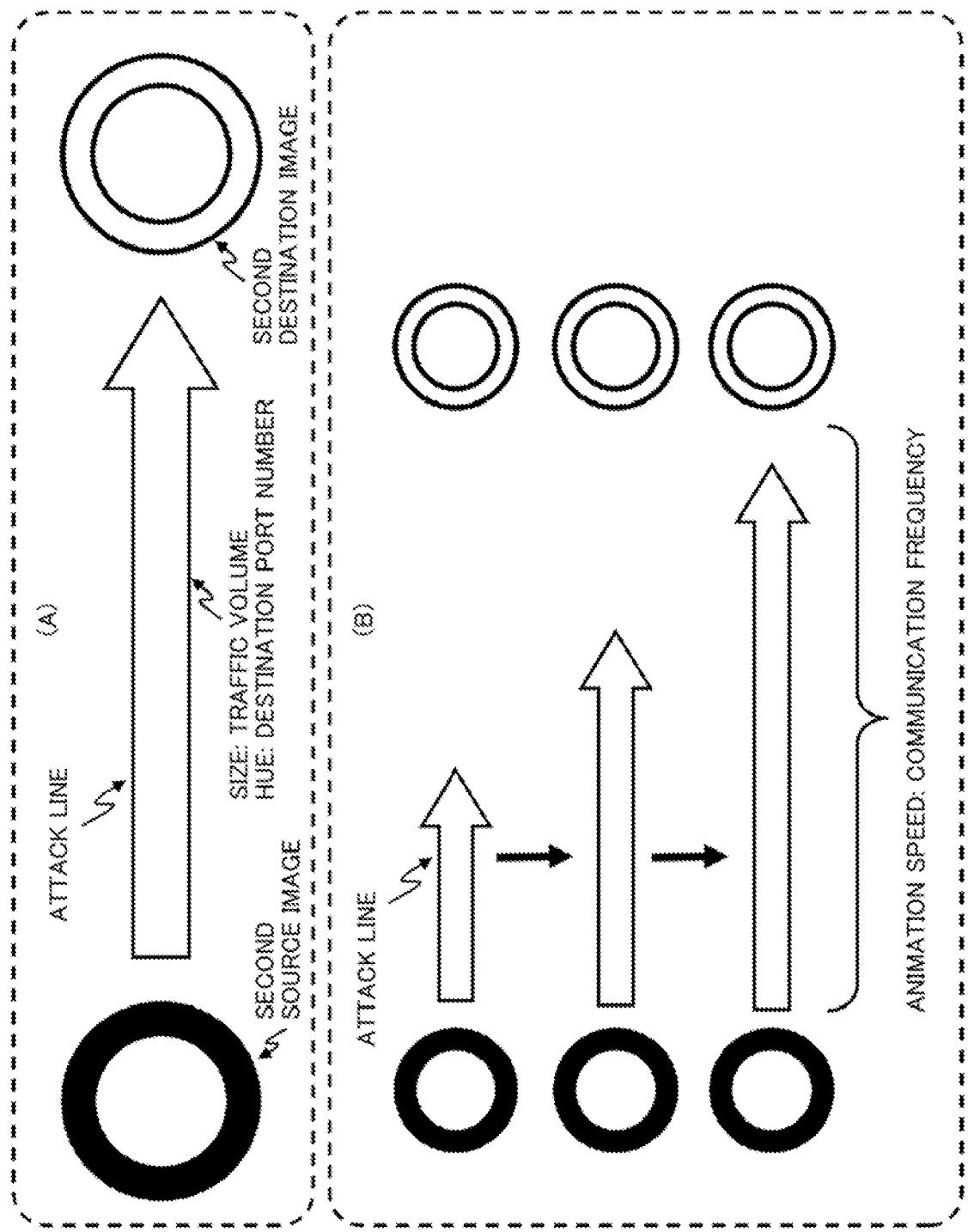
FIG. 19 is a diagram illustrating a specific example of an attack situation image.

FIG. 19 illustrates a specific example of an attack situation image (an attack line in particular) generated by the attack line generation unit 502c. In the specific example illustrated in FIG. 19, an attack line is drawn as a drawing element having an almost arrow shape. In the specific example illustrated in FIG. 19, a size of the attack line represents a traffic volume related to a communication between a source and a destination, and a color of the attack line represents a port number of the destination [a part (A) in FIG. 19]. Specifically, the attack line generation unit 502c may generate the attack line in such a way that a width (or a diameter) of the segment part (shaft part) of the arrow increases in proportion to a traffic volume and may generate the attack line in such a way that an entire area of the arrow increases. The traffic volume in this case may be a traffic volume per unit time between the source and the destination, or a total traffic volume in a certain period. Further, when the attack line is displayed as an animation, an animation speed of the attack line represents a communication frequency [a part (B) in FIG. 19]. The communication frequency in this case may be a communication frequency per unit time.

Through the processing as described above, for example, the attack line generation unit 502c can generate an attack situation image allowing a user to readily recognize a situation (a traffic volume and a communication frequency in particular) of a cyberattack between a source and a destination.

The background image generation unit 502d generates a map image displayed as a background image in a display image. The background image generation unit 502d may generate, as a map image, an image in which a world map drawn on Mercator's projection is displayed as a blank map, similarly to the display information generation unit 102 according to the aforementioned first example embodiment.

The composition unit 502e generates display information causing display of a display image acquired by compositing a source image and a destination image that are generated in the arranged image generation unit 502b, an attack situation image (an attack line in particular) generated in the attack line generation unit 502c, and a map image generated in the background image generation unit 502d. For example, the display information may be image data representing a display image itself to be displayed or various types of data used in generation of a display image, similarly to the first example embodiment. For example, the display information may include a script or an executable binary causing execution of generation processing of a display image. For example, the display information may include a control signal for controlling a display device.

The conversion table storage unit 502f is a storage region capable of storing various types of conversion tables. For example, the conversion table storage unit 502f may be provided by one or more databases or files. For example, the conversion table storage unit 502f may store the log type table 502g, the attacker table 502h, the victim table 502i, and the coloration table 502j that are described above. The conversion table storage unit 502f may be included in the attack situation visualization device 500 as a component separate from the display information generation unit 502.

Operation

Figure 20:
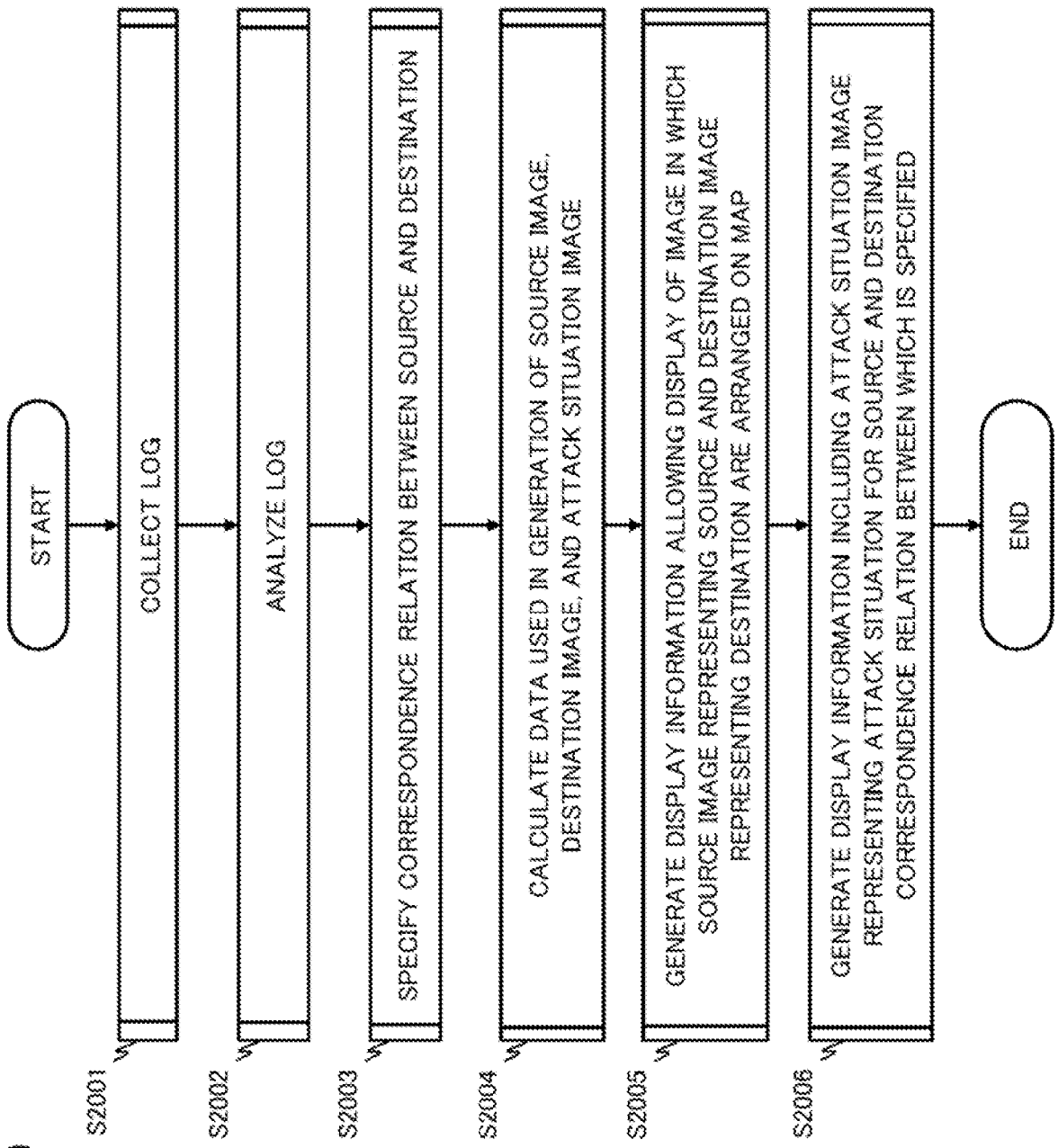
FIG. 20 is a flowchart illustrating an operation example of the attack situation visualization device according to the second example embodiment of the present disclosure.

An operation of the attack situation visualization device 500 configured as described above will be described. FIG. 20 is a flowchart illustrating an operation example of the attack situation visualization device 500.

The attack situation visualization device 500 (the log collection unit 503 in particular) collects various logs from the log source 510 (Step S2001). Specific processing in the log collection unit 503 is as described above.

The attack situation visualization device 500 (the log analysis unit 501 in particular) analyzes the collected logs (Step S2002). As described above, the log analysis unit 501 analyzes each record included in the collected logs and determines whether or not a destination IP address is included and whether or not a source IP address is included. Based on the determination result, the log analysis unit 501 stores each record into one of the source log table 501e, the destination log table 501f, and the attack log table 501g.

The attack situation visualization device 500 (the log analysis unit 501 in particular) specifies a correspondence relation between a source and a destination that are recorded in records stored in each log table (Step S2003). As described above, a source IP address and a destination IP address are recorded in a record stored in the attack log table 501g. Consequently, the log analysis unit 501 associates the source IP address recorded in the record stored in the attack log table 501g with the destination IP address.

The log analysis unit 501 also specifies relevance between a plurality of records being acquired in a certain period and being stored in the source log table 501e and the destination log table 501f. More specifically, by making an inquiry to an information source 520 by use of the external information inquiry unit 504, the log analysis unit 501 specifies a correspondence relation between a source included in a record stored in the source log table 501*e* and a destination included in a record stored in the destination log table 501*f*.

As described above, for example, the log analysis unit 501 makes an inquiry to an information source 520 with a source IP address or a destination IP address as a key for search and extracts intermediate information by analyzing the response. For example, when a destination IP address stored in the destination log table 501*f* is included in a search result acquired from an information source 520 with a source IP address stored in the source log table 501*e* as a key, the log analysis unit 501 associates the IP addresses with one another. Similarly, for example, when a destination IP address stored in the source log table 501*e* is included in a search result acquired from an information source 520 with a destination IP address stored in the destination log table 501*f* as a key, the log analysis unit 501 associates the IP addresses with one another. The log analysis unit 501 may store a record including a source and a destination a correspondence relation between which is specified into the attack log table 501*g*.

The attack situation visualization device 500 (the log analysis unit 501 in particular) calculates data used for generation of a source image, a destination image, and an attack situation image (Step S2004). As described above, for example, the log analysis unit 501 may specify a geographical location (for example, a country and a city) where a source or a destination is arranged from the source IP address or the destination IP address and calculate a latitude and a longitude indicating the location. The log analysis unit 501 may also calculate a traffic volume and a communication frequency that are related to a communication transmitted from a source. The log analysis unit 501 may also calculate a traffic volume and a communication frequency that are related to a communication transmitted to a destination. The log analysis unit 501 may calculate a traffic volume and a communication frequency between a source and a destination a correspondence relation between which is specified. The log analysis unit 501 may provide various types of calculated data for the display information generation unit 502.

The attack situation visualization device 500 (the display information generation unit 502 in particular) generates display information allowing display of an image in which a source image representing a source and a destination image representing a destination are arranged on a map (Step S2005). For example, the display information generation unit 502 may acquire, from a record stored in each log table, a date and time, at least either of a source IP address and a destination IP address, a destination port number, and a traffic volume. For example, the display information generation unit 502 may specify a log type related to each record, based on whether or not a source IP address is recorded and whether or not a destination IP address is recorded. The display information generation unit 502 may specify an attacker to which a source belongs, from a source IP address and a destination port number. The display information generation unit 502 may also specify a victim to which a destination belongs, from a destination IP address.

The display information generation unit 502 also acquires a traffic volume and a communication frequency that are related to a communication transmitted from a source. The display information generation unit 502 may acquire data calculated in the log analysis unit 501. For example, the display information generation unit 502 may determine a source traffic volume "m1" as a total traffic volume transmitted from the same attacker in a certain period (for example, "d"). A traffic volume per unit time may be calculated by dividing the traffic volume "m1" by the certain period "d." Further, for example, the display information generation unit 502 may calculate a communication frequency per unit time by dividing a number of records being related to the same attacker (source) and being recorded in the certain period by "d."

The display information generation unit 502 generates a source image for a source, based on a log type of a record in which the source is recorded, an attacker to which the source belongs, and a traffic volume and a communication frequency that are related to the source.

Similarly, the display information generation unit 502 acquires a traffic volume and a communication frequency that are related to a communication transmitted to a destination. The display information generation unit 502 may acquire data calculated in the log analysis unit 501. For example, the display information generation unit 502 may determine a destination traffic volume "m2" as a total traffic volume transmitted to the same victim in a certain period "d." A traffic volume per unit time may also be calculated by dividing the traffic volume "m2" by the certain period "d." Further, for example, the display information generation unit 502 may also calculate a communication frequency per unit time by dividing a number of records being related to the same victim (destination) and being recorded in the certain period by "d."

The display information generation unit 502 generates a destination image for a destination, based on a log type of a record in which the destination is recorded, a victim to which the destination belongs, and a traffic volume and a communication frequency that are related to the destination.

The attack situation visualization device 500 (the display information generation unit 502 in particular) generates display information including an attack situation image representing an attack situation for a source and a destination between which a correspondence relation is specified (Step S2006). Specifically, the display information generation unit 502 acquires a traffic volume and a communication frequency that are related to a communication executed between a source and a destination between which a correspondence relation is specified. The display information generation unit 502 may acquire data calculated in the log analysis unit 501. For example, the display information generation unit 502 may determine, from a record stored in the attack log table 501*g*, a total attack traffic volume "m3" as a total traffic volume executed between the same attacker and the same victim in a certain period "d." A traffic volume per unit time may be calculated by dividing the traffic volume "m3" by the certain period "d." The display information generation unit 502 may calculate a communication frequency per unit time by dividing a number of records being related to a communication executed between the same attacker and the same victim in the certain period "d" and being stored in the attack log table 501*g* by "d."

The display information generation unit 502 generates an attack situation image including an attack line, based on a destination port number, an attacker to which a source belongs, a victim to which a destination belongs, a traffic volume (a total traffic volume and a traffic volume per unit time) between the source and the destination, and a log frequency per unit time. A specific method of generating an attack line is as described above.

For example, the attack situation visualization device 500 may cause the display device 530 to display a display image, by providing the display information generated in Steps S2005 and S2006 for the display device 530.

Specific Example of Display Image

Figure 21:
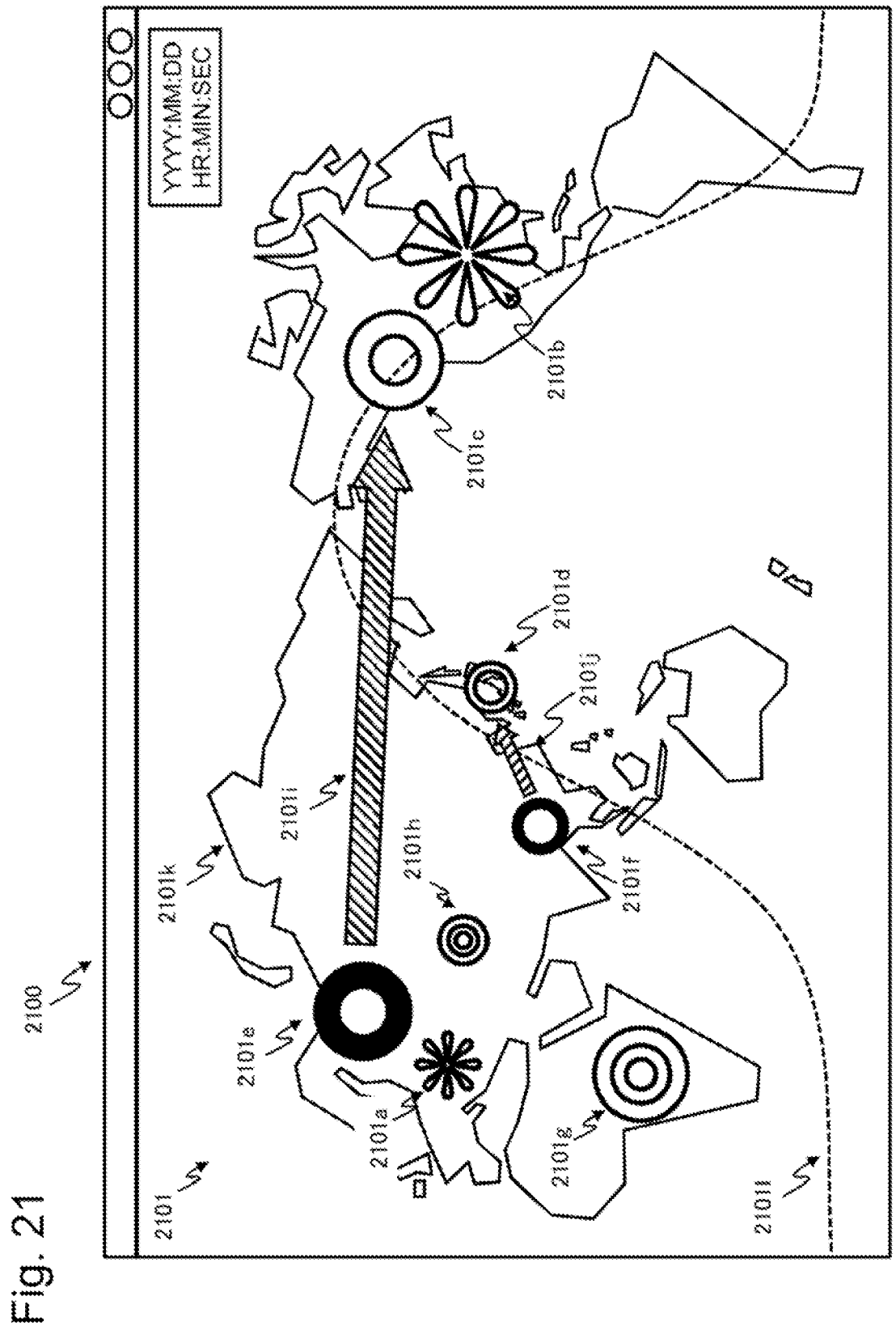
FIG. 21 is a diagram illustrating a specific example of an attack situation visualized by the attack situation visualization device according to the second example embodiment of the present disclosure.

A specific example of a display image displayed by display information generated by the attack situation visualization device 500 will be described below with reference to FIG. 21. FIG. 21 is a diagram illustrating a specific example of a user interface 2100 displayed on the display device 530 according to display information generated by the attack situation visualization device 500. A display image 2101 is displayed on the user interface 2100. FIG. 21 is a diagram illustrating a specific example for description and does not limit the present example embodiment.

A map (2101k in FIG. 21) is displayed on the display image 2101. Source images (2101e, 2101f, 2101g, and 2101h in FIG. 21) each representing a source of a cyberattack and destination images (2101a, 2101b, 2101c, and 2101d in FIG. 21) are displayed on the map 2101k. Further, attack situation images (2101i and 2101j in FIG. 21) are displayed between source images and destination images when a correspondence relation between each source and each destination that are related to a cyberattack is specified. Further, a day and night boundary line 21011 may be displayed on the map.

Each of the destination images 2101a and 2101b is a destination image in a case of only a destination being specified from a log, and each of the destination images 2101c and 2101d is a destination image in a case of a correspondence relation between a source and a destination being specified from a log. In other words, different destination images are displayed depending on a log type.

Each of the source images 2101g and 2101h is a source image in a case of only a source being specified from a log, and each of the source images 2101e and 2101f is a source image in a case of a correspondence relation between a source and a destination being specified from a log. In other words, different source images are displayed depending on a log type.

Further, the destination image 2101c is displayed as an image with a larger area than the destination image 2101d. This illustrates that a destination represented by the destination image 2101c has a larger traffic volume than a destination represented by the destination image 2101d. Similarly, a destination represented by the destination image 2101b having a larger traffic volume than a destination represented by the destination image 2101a is illustrated. The same holds for the source images 2101e, 2101f, 2101g, and 2101h.

As described above, an attacker to which each source belongs can be expressed by a hue of the source image, and a victim to which each destination belongs can be expressed by a hue of the destination image. Further, when a source image is an animation image, a communication frequency at the source can be expressed by an animation speed of the image. Similarly, when a destination image is an animation image, a communication frequency at the destination can be expressed by an animation speed of the image.

Further, an attack line in the attack situation image 2101i is displayed as an image with a larger area than an attack line in the attack situation image 2101j. This illustrates that a traffic volume expressed by the attack situation image 2101i is greater than a traffic volume expressed by the attack situation image 2101j. Further, when an attack line is displayed as an animation, an animation speed of the attack line may express a communication frequency between a source and a destination.

By displaying the day and night boundary line 21011, whether areas where a source and a destination of an attack are arranged are in the daytime or the nighttime can be distinguished. Consequently, for example, a user can visually grasp a trend of a time period when a cyberattack is executed.

The attack situation visualization device 500 according to the present example embodiment configured as described above can clearly visualize a situation of a security-related attack such as a cyberattack. The reason is as follows.

By analyzing logs provided from various types of log sources, the attack situation visualization device 500 can generate images representing a source, a destination, and an attack situation with respect to a cyberattack, similarly to the attack situation visualization device 100 according to the first example embodiment.

From a log in which only a source related to a communication is specified and a log in which only a destination related to a communication is specified, the attack situation visualization device 500 can further specify a correspondence relation between the source and the destination by using various types of external information sources.

Information allowing specification of both a source and a destination that are related to a cyberattack may not necessarily be recorded in a log provided from a log source. Even in such a situation, for example, by repeatedly making an inquiry to the information source 520 by use of the external information inquiry unit 504, the attack situation visualization device 500 can specify a correspondence relation between a source and a destination.

In general, a transmission source of a cyberattack tends to be hidden, and a source may be disguised. Further, an attack may be executed through a springboard machine, a bot, or the like. When a source is disguised, a true attacker may not necessarily be specified from a source recorded in communication data (a packet). In other words, a method of specifying a source directly included in communication data (for example, the aforementioned patent literatures) may not necessarily be able to specify a true attacker. The same holds for a case of an attack being executed through a mediator such as a springboard machine or a bot. Further, when sources are widely spread, a content to be displayed may become overly complicated.

On the other hand, for example, the attack situation visualization device 500 may acquire security-related information provided by various types of security vendors and the like as information sources 520, and information about network services. By analyzing various types of information acquired from the information sources 520, the attack situation visualization device 500 may more suitably specify an attacker related to a cyberattack.

The attack situation visualization device 500 can also adjust a display form of a source image representing a source, according to a traffic volume and a communication frequency that are related to a communication transmitted from the source and an attacker to which the source belongs. Similarly, the attack situation visualization device 500 can adjust a display form of a destination image representing a destination, according to a traffic volume and a communication frequency that are related to a communication transmitted to the destination and a victim to which the destination belongs. Specifically, for example, the attack situation visualization device 500 can appropriately change at least one of a shape (including a size), coloration, and an animation speed of a source image and a destination image. Consequently, a user can visually recognize a situation of an attack at the source and the destination.

The attack situation visualization device 500 can also adjust a display form of an attack situation image according to a traffic volume and a communication frequency between a source and a destination, a destination port number, and the like. Specifically, for example, the attack situation visualization device 500 can appropriately change at least one of a shape (including a size), coloration, and an animation speed of an attack line included in an attack situation image. Consequently, a user can visually recognize a situation of an attack between the source and the destination.

By using the attack situation visualization device 500 configured as described above, for example, a user can readily recognize an attacker and a victim that are related to a cyberattack. Further, the user can recognize a severity level of the attack from a communication frequency, a traffic volume, and the like of the cyberattack.

Modified Example of Second Example Embodiment

A modified example of the aforementioned second example embodiment will be described below. A functional configuration of an attack situation visualization device 500 in this modified example may be similar that according to the aforementioned second example embodiment. In this modified example, a function of a display information generation unit 502 (an attack line generation unit 502c in particular) is extended.

The attack line generation unit 502c in this modified example changes a display form of an attack line according to a confidence level between a source and a destination. Specifically, the attack line generation unit 502c generates attack lines in different display forms depending on whether a correspondence relation between a source and a destination is a one-way correspondence relation or a two-way correspondence relation, the correspondence relation being specified by use of an external information inquiry unit 504. As an example, the attack line generation unit 502c may change a pattern of the attack line, depending on the case above. Without being limited to the above, the attack line generation unit 502c may appropriately change a display form of an attack line by use of a suitable expression method different from an expression method (for example, a shape, an animation speed, and a hue) expressing a traffic volume and a communication frequency between a source and a destination, and a destination port number.

Consequently, for example, a user of the attack situation visualization device 500 can visually recognize a confidence level of a correspondence relation between a source and a destination that are specified for a cyberattack.

Third Example Embodiment

A third example embodiment of the technology according to the present disclosure will be described below. The present example embodiment is an example embodiment being based on the aforementioned second example embodiment and extending part of the function thereof. A configuration similar to that according to the second example embodiment is hereinafter given the same reference sign, thus omitting detailed description thereof.

Figure 22:
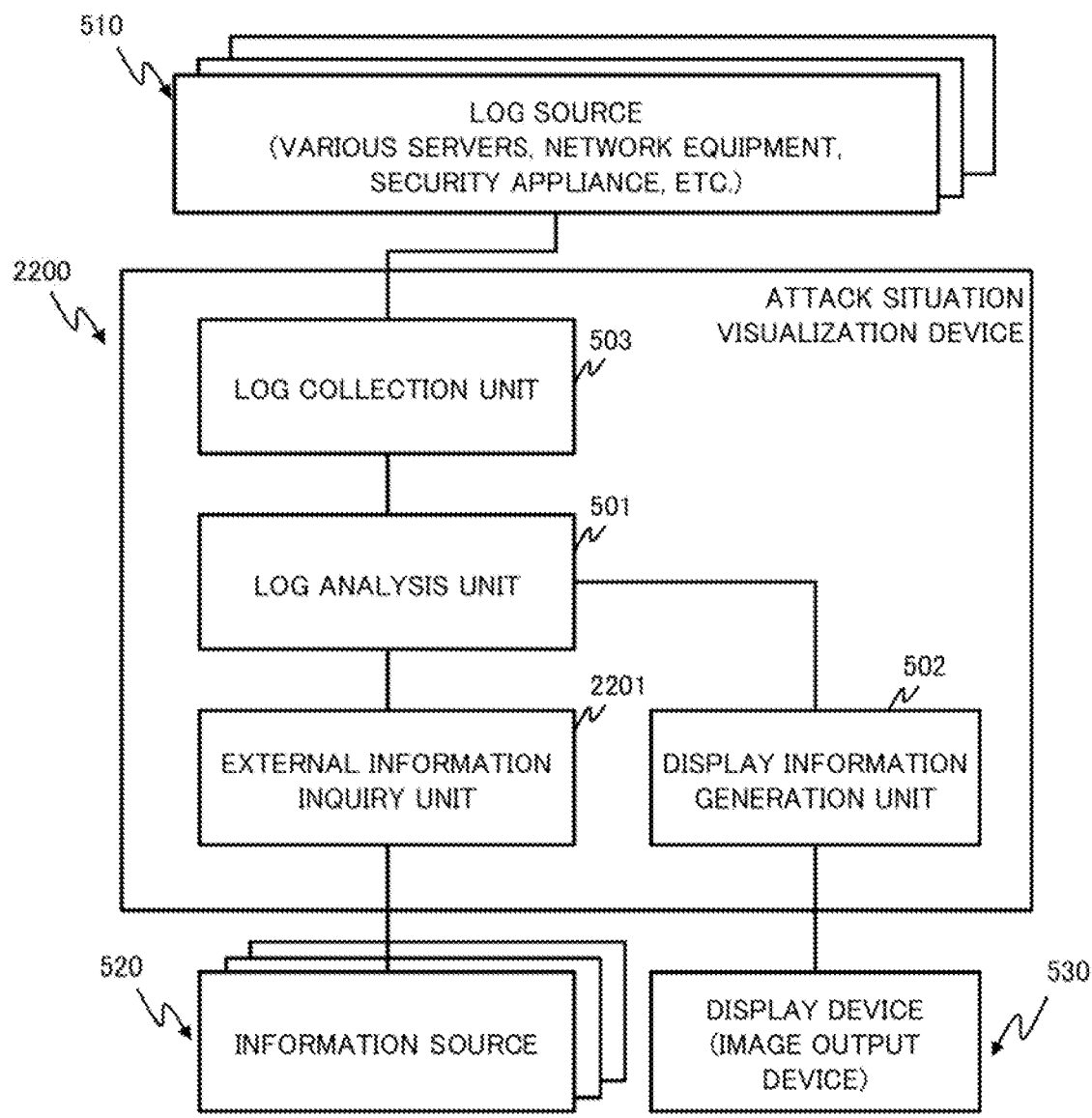
FIG. 22 is a block diagram illustrating a functional configuration of an attack situation visualization device according to a third example embodiment of the present disclosure.

FIG. 22 is a block diagram illustrating a functional configuration of an attack situation visualization device 2200 according to the present example embodiment. A function of an external information inquiry unit 2201 in the attack situation visualization device 2200 is extended from the attack situation visualization device 500 according to the second example embodiment. The other configuration in the attack situation visualization device 2200 may be similar to that in the attack situation visualization device 500 according to the second example embodiment. The external information inquiry unit 2201 will be described below.

Figure 23:
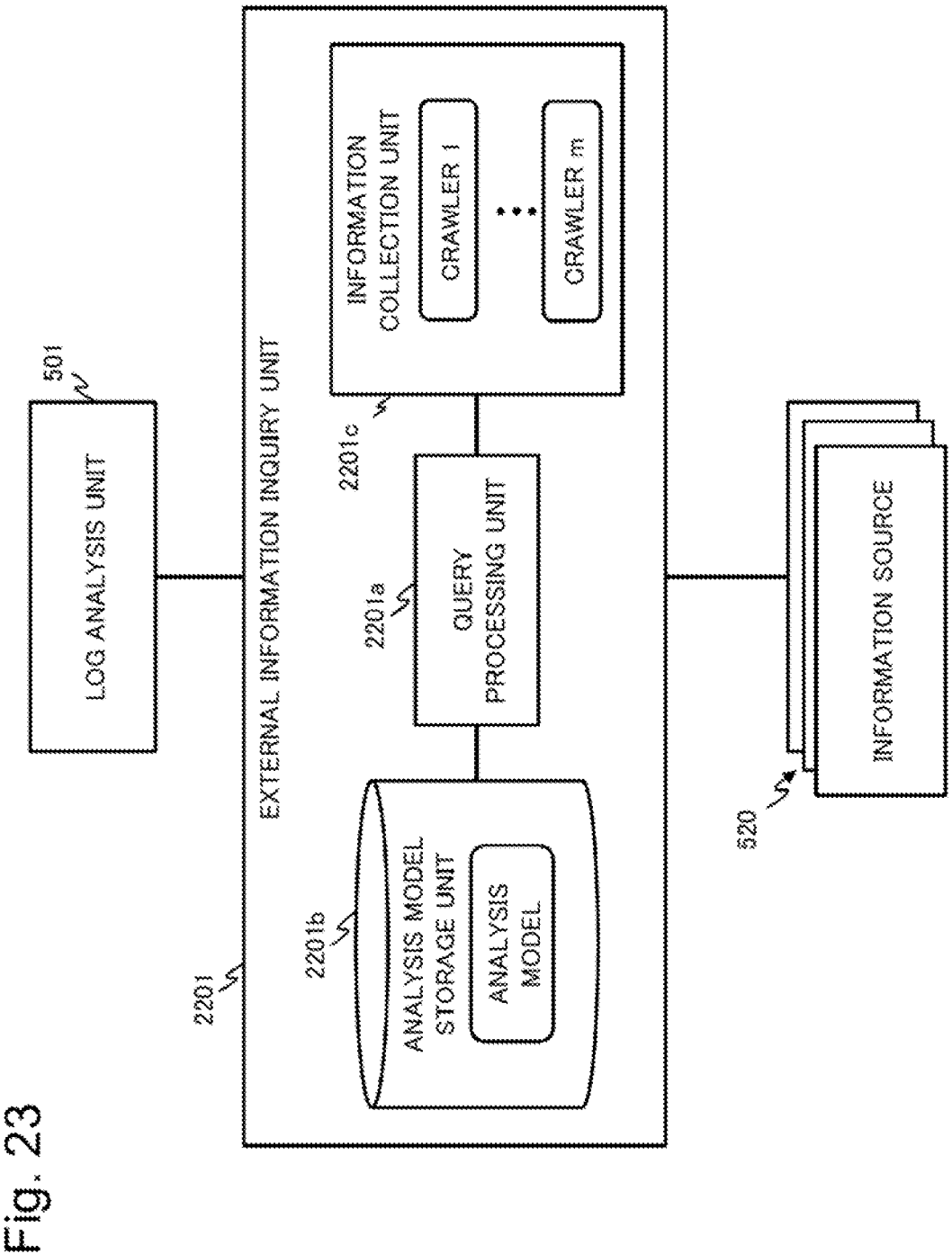
FIG. 23 is a block diagram illustrating a functional configuration of a component (external information inquiry unit) included in the attack situation visualization device according to the third example embodiment of the present disclosure.

FIG. 23 is a block diagram illustrating a functional configuration of the external information inquiry unit 2201. As illustrated in FIG. 23, the external information inquiry unit 2201 includes a query processing unit 2201a, an analysis model storage unit 2201b, and an information collection unit 2201c.

The query processing unit 2201a is configured to select, by use of an analysis model (to be described later), a crawler (to be described later) receiving a source designation IP address and a destination designation IP address as a search key and making a query using the search key. Further, the query processing unit 2201a is configured to specify a correspondence relation between the source designation IP address and the destination designation IP address by analyzing a response to the query made by the selected crawler. A specific processing by the query processing unit 2201a will be described later.

The analysis model storage unit 2201b stores an analysis model. The analysis model is a model configured to receive a search key as an input and calculate a score of each crawler capable of making an inquiry to an information source 520 using the search key. A specific example of the analysis model will be described later.

The information collection unit 2201c includes one or more crawlers. For example, a crawler is configured to execute inquiry processing using a search key on an information source 520 and provide the result for the query processing unit 2201a. One or more crawlers may be allocated to one information source 520, and one crawler may be allocated to a plurality of information sources 520.

A crawler is configured to execute inquiry processing by use of a suitable method for each information source 520. As an example, a crawler may be configured to transmit a query for search to an information source 520 and receive a response to the query. As another example, a crawler may be configured to acquire a content provided by an information source 520 and search the acquired content for intermediate information.

Analysis Model

Figure 24:
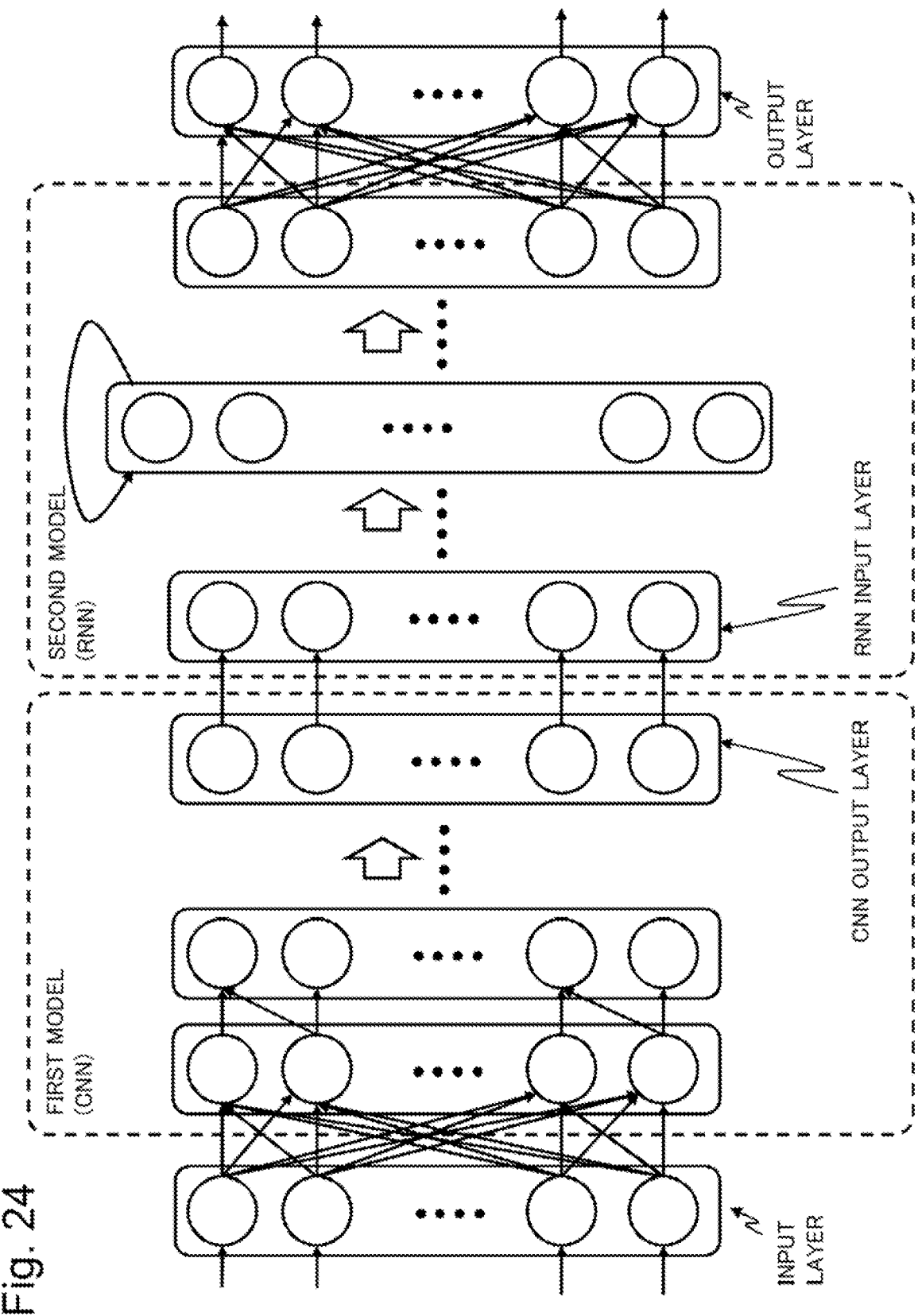
FIG. 24 is a diagram illustrating a specific example of an analysis model.

An analysis model will be described below. FIG. 24 is a diagram illustrating an outline of an analysis model. The analysis model illustrated in FIG. 24 is a specific example for description and does not limit the analysis model according to the present example embodiment.

As illustrated in FIG. 24, the analysis model according to the present example embodiment is configured by use of a neural network as a whole. Specifically, the analysis model is configured as a neural network combining a first model and a second model.

For example, a model capable of learning a static feature (for example, a pattern) of data representing a search key is used as the first model. For example, by convoluting some type of data (for example, an IP address and a host name) included in a search key, the first model can convert similar data (for example, a partially different IP addresses) in such a way that the data can be handled as data having a similar meaning. A convolutional neural network (CNN) configured to couple specific units (nodes constituting a neural network) out of units included in adjacent intermediate layers is used as the first model according to the present example embodiment.

A model capable of learning a process of acquiring intermediate information by repeatedly executing queries to an information source 520 is used as the second model. A recurrent neural network (RNN) is used as the second model capable of learning a process of repeatedly executing queries, according to the present example embodiment.

The first model (CNN) will be described below. A CNN is generally a neural network including one or more convolutional layers. The CNN may include a pooling layer in addition to the convolutional layer. A convolutional layer is generally configured to execute some processing (filtering) on input data and generate data (map data) converted from the input data. For example, when a filter capable of extracting a pattern of data is formed in a convolutional layer, data (feature data) representing a feature of a specific pattern are acquired from specific input data as map data. Since the filter is applied to the entire region of input data in the convolutional layer, feature data can be extracted from input data without previously considering locations of and a number of pieces of data included in the input data. A pooling layer is generally configured to extract a representative value from a region (pooling region) included in map data output from a convolutional layer. By providing a pooling layer, dimensions of data can be reduced while maintaining a characteristic value included in map data output from a convolutional layer.

The second model (RNN) will be described below. An RNN is generally a neural network including at least one intermediate layer including a feedback loop. In the RNN, an intermediate layer including a feedback loop can provide an output from the intermediate layer in a state earlier than a certain state as an input to the intermediate layer in the certain state. Consequently, when calculating output data with respect to input data, the RNN can reflect an effect of input data received in the past. For example, an RNN employing a long short-term memory (LSTM) may be used as the second model according to the present example embodiment.

Data representing a search key are input to an input layer of the analysis model configured by use of the first and second models as described above. As described above, a search key may be a source designation IP address or a destination designation IP address. The search key may also be intermediate information acquired by analyzing a response to a query to an information source 520. A number of units in the input layer may be appropriately selected according to a size and a nature of the search key. For example, when the search key is expressed by text data, the input layer may include the same number of units as a number of characters (1024 characters as a specific example) extracted from the text data.

A score for each crawler is output from an output layer of the analysis model. A number of units in the output layer may be suitably selected according to a number of crawlers. For example, when the number of crawlers is "m" (where "m" is a natural number), the number of units in the output layer may be "m." Since there are "$2^m$" combinations for selecting 0 or greater and "m" or less crawlers from "m" crawlers, the number of units in the output layer may be "$2^m$."

A score of each crawler calculated by the analysis model from an input search key is information indicating usefulness (suitability) of executing a query about the input search key by use of each crawler. Specifically, a higher score calculated for a search key indicates a higher probability of acquiring useful intermediate information (or a desired IP address) by a query using the crawler. For example, useful intermediate information refers to information used for specification of a correspondence relation between a source and a destination. As an example, such intermediate information may be a destination IP address related to a source designation IP address or a source IP address related to a destination designation IP address. Further, such intermediate information may be other information (for example, a host name, a URL, and a malware name) being directly or indirectly useful for acquisition of a destination IP address related to a source designation IP address and acquisition of a source IP address related to a destination designation IP address.

For example, the analysis model as described above may be created by executing learning processing as roughly described below. It is hereinafter assumed for convenience of description that the analysis model is created by use of a device (described as a "learning device") different from the attack situation visualization device 2200. It is further assumed for convenience of description that the learning device includes a crawler similar to each crawler included in the information collection unit 2201*c*.

For example, the learning device may include data including a source designation IP address and a destination designation IP address a correspondence relation between which is previously specified, as training data for learning the analysis model. For example, such training data may be created by manually checking a record stored in each log table by an analyst. In this case, it may be considered that the training data reflect knowledge of the analyst.

For example, the learning device may learn the analysis model by use of a framework of Q-learning being one of reinforcement learning techniques. An outline will be described below.

For example, the learning device inputs a source designation IP address included in training data as an input (search key) to the analysis model in a learning process and calculates a score for each crawler. For example, the learning device selects a crawler with the highest score or randomly selects a crawler, with a predetermined probability. The learning device executes a query to an information source 520 by use of the selected crawler. A search key corresponds to a state in reinforcement learning, and selection of a crawler and execution of a query correspond to an action in reinforcement learning. The learning device analyzes a response to a query and extracts intermediate information. The learning device calculates a reward based on usefulness of the intermediate information. A relation between intermediate information and a reward may be appropriately designed. The learning device calculates the maximum score value of each crawler in a case of the intermediate information being input to the analysis model as a new search key. The learning device learns the analysis model in such a way as to decrease the difference between the calculated maximum value and a score of a crawler selected the last time. Consequently, for example, the analysis model is learned in such a way that a relatively high score is calculated for a crawler capable of acquiring intermediate information with high usefulness by executing a query using a search key. A method described in reference 1 below may be employed as a learning algorithm in Q-learning using a neural network.

Reference 1

Volodymyr Mnih, Koray Kavukcuoglu, David Silve, Alex Graves, Ioannis Antonoglou, Daan Wierstra, and Martin A. Riedmiller, "Playing Atari with Deep Reinforcement Learning," Neural Information Processing Systems (NIPS) Deep Learning Workshop, 2013 ([online], [retrieved on Jan. 9, 2017], the Internet <URL: http://arxiv.org/abs/1312.5602)

For example, a pre-learned analysis model on which learning processing is previously executed by the learning device may be provided for the attack situation visualization device 2200, and such analysis model may be stored in the analysis model storage unit 2201b.

Operation

An operation of the external information inquiry unit 2201 (the query processing unit 2201a in particular) will be described.

The query processing unit 2201a receives one or more source designation IP addresses and destination designation IP addresses from the log analysis unit.

The query processing unit 2201a inputs a source designation IP address to the analysis model and calculates a score for each crawler.

The query processing unit 2201a selects a crawler with the highest calculated score and requests execution of an inquiry (query). The selected crawler executes a query to an information source 520 associated with the crawler, with the source designation IP address as a search key, and provides the response for the query processing unit 2201a.

The query processing unit 2201a stores various types of data acquired by analyzing the response as intermediate information. Processing of analyzing the response may be similar to that by the external information inquiry unit 504 according to the aforementioned first example embodiment.

The query processing unit 2201a checks whether or not information stored as the intermediate information includes the destination designation IP address provided from the correspondence relation estimation unit 501b, similarly to the external information inquiry unit 504 according to the aforementioned first example embodiment.

When an IP address matching the destination designation IP address is not included in the intermediate information, the query processing unit 2201a inputs the intermediate information to the analysis model as information for search (a search key) and calculates a score for each crawler. The query processing unit 2201a selects a crawler with the highest calculated score and requests execution of an inquiry (query) again. The selected crawler executes a query to an information source 520 associated with the crawler, with the intermediate information as a search key, and provides the response for the query processing unit 2201a.

The query processing unit 2201a may repeatedly execute the aforementioned processing until an IP address matching the destination designation IP address is acquired. When an IP address matching the provided destination designation IP address is not acquired, the query processing unit 2201a may abort the aforementioned processing at a specific count. In this case, the query processing unit 2201a may notify the log analysis unit 501 that a correspondence relation between the source designation IP address and the destination designation IP address is not specified.

When an IP address matching the destination designation IP address is acquired as intermediate information through the aforementioned processing, the query processing unit 2201a may provide the log analysis unit 501 with information tying the destination designation IP address to the source designation IP address used as the query. For example, the query processing unit 2201a may execute the aforementioned processing on every source designation IP address provided from the correspondence relation estimation unit 501b and provide the result for the correspondence relation estimation unit 501b.

The query processing unit 2201a may also execute processing similar to the above with a destination designation IP address as information for search (a search key).

Through the processing as described above, the query processing unit 2201a can specify a correspondence relation between a source designation IP address and a destination designation IP address that are provided from the log analysis unit 501.

The attack situation visualization device 2200 configured as described above can more suitably specify a correspondence relation between a source and a destination from one or more records allowing specification of only sources and one or more records allowing specification of only destinations. The reason is that, by using an analysis model, the attack situation visualization device 2200 (the external information inquiry unit 2201 in particular) can suitably select a crawler executing a query to an information source 520. The analysis model is configured to calculate a higher score for a crawler capable of executing a query by which a response including a target IP address is more likely to be acquired from a search key received as an input. Consequently, for example, the attack situation visualization device 2200 can select a more suitable crawler, based on a score output by the analysis model.

Hardware and Software Program (Computer Program) Configurations

A hardware configuration capable of providing each of the example embodiments and the modified example described above will be described below. In the following description, the respective attack situation visualization devices (100, 500, and 2200) described in the respective aforementioned example embodiments are collectively described as "attack situation visualization devices."

Each attack situation visualization device described in each of the aforementioned example embodiments may be configured with one or a plurality of dedicated hardware devices. In that case, each component illustrated in each of the aforementioned diagrams (for example, FIGS. 1, 5-7, 22, and 23) may be provided as a piece of hardware (such as an integrated circuit on which processing logic is implemented) integrating a part or the whole of the component. For example, when an attack situation visualization device is provided by a hardware device, a component of the attack situation visualization device may be implemented as an integrated circuit (for example, a system on a chip [SoC]) capable of providing each function. In this case, for example, data held in a component in the attack situation visualization device may be stored in a random access memory (RAM) area or a flash memory area integrated on the SoC.

In this case, for example, the attack situation visualization device may be provided by use of one or more processing circuits capable of providing the functions of the log analysis units (101 and 501), the display information generation units (102 and 502), the log collection unit 503, and the external information inquiry units (504 and 2201), a communication circuit, and a storage circuit. Various variations may be assumed in implementation of circuit configurations providing the attack situation visualization device. When the attack situation visualization device is configured with a plurality of hardware devices, the hardware devices may be communicably connected to one another by a suitable communication method (wired, wireless, or a combination of both).

Figure 25:
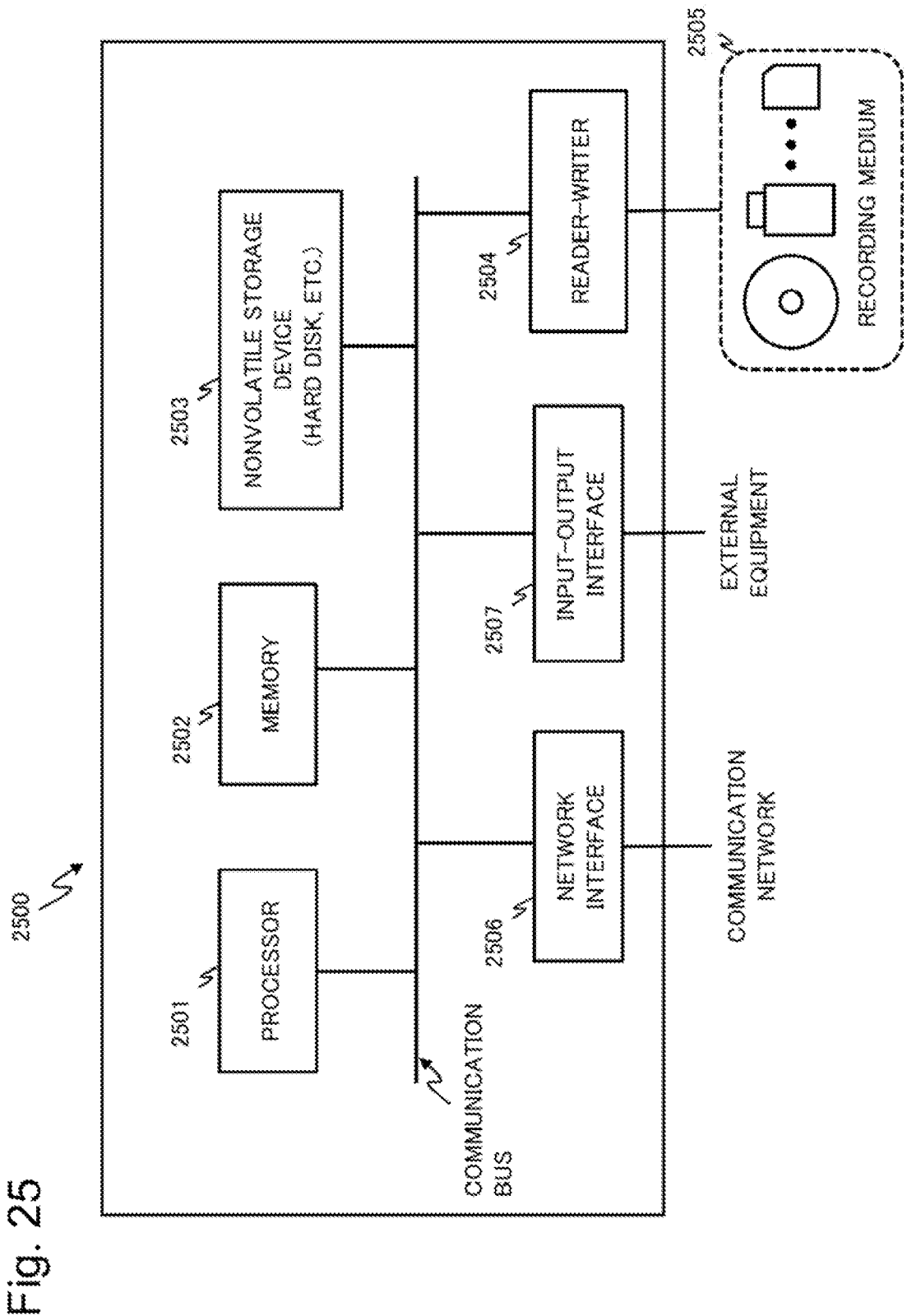
FIG. 25 is a diagram illustrating a hardware configuration capable of providing each example embodiment.

Further, the aforementioned attack situation visualization device may be configured with a general-purpose hardware device 2500 illustrated in FIG. 25 and various types of software programs (computer programs) executed by the hardware device 2500. In this case, the attack situation visualization device may be configured with a suitable number (one or more) of the hardware devices 2500 and software programs.

For example, a processor 2501 in FIG. 25 is a general-purpose central processing unit (CPU) or a microprocessor. For example, the processor 2501 may read various types of software programs stored in a nonvolatile storage device 2503, to be described later, into a memory 2502 and execute processing in accordance with the software programs. In this case, a component in the attack situation visualization device according to each of the aforementioned example embodiments may be provided as, for example, a software program executed by the processor 2501.

In this case, the attack situation visualization device according to each of the aforementioned example embodiments may be provided by, for example, one or more programs capable of providing the functions of the log analysis units (101 and 501), the display information generation units (102 and 502), the log collection unit 503, and the external information inquiry units (504 and 2201). Various variations may be assumed in implementation of such programs.

The memory 2502 is a memory device referenceable from the processor 2501, such as a RAM, and stores a software program, various types of data, and the like. The memory 2502 may be a volatile memory device.

For example, the nonvolatile storage device 2503 is a nonvolatile storage device such as a magnetic disk drive or a semiconductor storage device (such as a flash memory). The nonvolatile storage device 2503 may store various types of software programs, data, and the like. In the aforementioned attack situation visualization device, various types of tables kept in the log analysis unit 501 and the display information generation unit 502 may be stored in, for example, the nonvolatile storage device 2503.

For example, a reader-writer 2504 is a device processing a read and a write of data from and into a recording medium 2505, to be described later. For example, the attack situation visualization device may read a log recorded in the recording medium 2505 through the reader-writer 2504.

For example, the recording medium 2505 is a recording medium capable of recording data, such as an optical disk, a magneto-optical disk, or a semiconductor flash memory. In the present disclosure, a type and a recording method (format) of a recording medium is not particularly limited and may be appropriately selected.

A network interface 2506 is an interface device connected to a communication network, and, for example, an interface device for wired and wireless local area network (LAN) connection, or the like may be employed. The attack situation visualization device may be communicably connected to the information source 520 and the log source 510 through the network interface 2506.

An input-output interface 2507 is a device for controlling input and output from and to an external device. For example, the external device may be input equipment (for example, a keyboard, a mouse, and a touch panel) capable of receiving an input from a user. Further, for example, the external device may be output equipment (for example, a monitor screen and a touch panel) capable of presenting various types of outputs to a user. For example, the attack situation visualization device may control a user interface displayed on the display device 530 through the input-output interface.

For example, the technology according to the present disclosure may be provided by the processor 2501 executing a software program supplied to the hardware device 2500. In this case, an operating system, middleware such as database management software and network software, and the like that operate on the hardware device 2500 may execute part of the processing.

Each unit illustrated in each of the aforementioned diagrams, according to each of the aforementioned example embodiments, may be provided as a software module being a function (processing) unit of a software program executed by the aforementioned hardware. For example, when the respective aforementioned units are provided as software modules, the software modules may be stored in the nonvolatile storage device 2503. Then, when executing each type of processing, the processor 2501 may read the software modules into the memory 2502. Further, the software modules may be configured to be able to mutually convey various types of data by an appropriate method such as a shared memory or interprocess communication.

Further, each of the aforementioned software programs may be recorded in the recording medium 2505. In this case, each of the aforementioned software programs may be installed in the hardware device 2500 by use of a suitable jig (tool). Further, the various software programs may be downloaded from outside through a communication line such as the Internet. Various common procedures may be employed as a method of supplying a software program.

In such a case, the technology according to the present disclosure may be configured with a code constituting a software program or a computer-readable recording medium having the code recorded thereon. In this case, the recording medium may be a non-transitory recording medium independent of the hardware device 2500 or a recording medium storing or temporarily storing a software program downloaded by transmission through a LAN, the Internet, or the like.

Further, the aforementioned attack situation visualization device or a component of the attack situation visualization device may be configured with a virtual environment virtualizing the hardware device 2500 illustrated in FIG. 25 and a software program (computer program) executed in the virtual environment. In this case, a component of the hardware device 2500 illustrated in FIG. 25 is provided as a virtual device in the virtual environment.

The present disclosure has been described above with the aforementioned example embodiments as exemplary examples. However, the present disclosure is not limited to the aforementioned example embodiments. In other words, various aspects that may be understood by a person skilled in the art may be applied to the present disclosure, within the scope of the present disclosure.

A part or the whole of the aforementioned example embodiments may also be described as the following supplementary notes but are not limited thereto.

Supplementary Note 1

An attack situation visualization device including:

a log analysis means configured to analyze a log in which information about a cyberattack is recorded and specify at least either of a source of a communication related to the cyberattack and a destination of a communication related to the cyberattack; and a display information generation means configured to generate display information allowing display of an image in which an image representing a map, a source image representing the source, and a destination image representing the destination are arranged on the map, wherein, when a correspondence relation between the source and the destination to which a communication related to the cyberattack is transmitted from the source is specified, the display information generation means generates the display information including an attack situation image visualizing at least either of a traffic volume and a communication frequency of a communication related to the cyberattack between the source and the destination.

Supplementary Note 2

The attack situation visualization device according to supplementary note 1, wherein, when the source of a communication related to the cyberattack is specified from the log and the destination of a communication related to the cyberattack is not specified, the display information generation means generates the display information allowing display of a first source image being the source image representing the source, and, when both the source and the destination of a communication related to the cyberattack are specified from the log, the display information generation means generates the display information allowing display of a second source image being the source image representing the source and being different from the first source image.

Supplementary Note 3

The attack situation visualization device according to supplementary note 1 or 2, wherein, when the destination of a communication related to the cyberattack is specified from the log and the source of a communication related to the cyberattack is not specified, the display information generation means generates the display information allowing display of a first destination image being the destination image representing the destination, and, when both the source and the destination of a communication related to the cyberattack are specified from the log, the display information generation means generates the display information allowing display of a second destination image being the destination image representing the destination and being different from the first destination image.

Supplementary Note 4

The attack situation visualization device according to any one of supplementary notes 1 to 3, wherein, when both the source and the destination related to the cyberattack are specified from the log, the log analysis means calculates a traffic volume related to the cyberattack between the source and the destination, and the display information generation means generates the display information causing a shape of the attack situation image to change depending on a change in a traffic volume.

Supplementary Note 5

The attack situation visualization device according to any one of supplementary notes 1 to 4, wherein, when both the source and the destination related to the cyberattack are specified from the log, the log analysis means calculates a communication frequency related to the cyberattack between the source and the destination, and the display information generation means generates the display information causing an animation speed of the attack situation image to change depending on a change in a communication frequency.

Supplementary Note 6

The attack situation visualization device according to supplementary note 4 or 5, wherein the log analysis means calculates, from the log, a source traffic volume being a traffic volume of a communication related to the cyberattack transmitted from the source, and a destination traffic volume being a traffic volume of a communication related to the cyberattack transmitted to the destination, and the display information generation means generates the display information causing a shape of the source image to change depending on a change in the source traffic volume and causing a shape of the destination image to change depending on a change in the destination traffic volume.

Supplementary Note 7

The attack situation visualization device according to any one of supplementary notes 4 to 6, wherein the display information generation means generates the display information causing a hue of the source image to change according to information indicating an attacker to which the source belongs and causing a hue of the destination image to change according to information indicating a victim to which the destination belongs.

Supplementary Note 8

The attack situation visualization device according to any one of supplementary notes 4 to 7, wherein the log analysis means calculates, from the log, a source communication frequency being a communication frequency of a communication related to the cyberattack transmitted from the source, and a destination communication frequency being a communication frequency of a communication related to the cyberattack transmitted to the destination, and the display information generation means generates the display information causing an animation speed of the source image to change depending on a change in the source communication frequency and causing an animation speed of the destination image to change depending on a change in the destination communication frequency.

Supplementary Note 9

The attack situation visualization device according to any one of supplementary notes 1 to 8, further including an external information inquiry means configured to transmit a request including source specification information indicating the source recorded in a log allowing specification of only the source of a communication related to the cyberattack, out of the log, to one or more information sources each providing information in response to a request received through a communication network, and when a response received from the information source does not include destination specification information indicating the destination recorded in a log allowing specification of only the destination of a communication related to the cyberattack, out of the log, receive the response including the destination specification information by repeating processing of transmitting, to the information source, the request including specific information included in the response, and then associate the source specification information with the destination specification information included in the response, wherein the display information generation means generates the display information including the attack situation image related to the cyberattack between the source specification information and the destination specification information that are associated by the external information inquiry means.

Supplementary Note 10

The attack situation visualization device according to any one of supplementary notes 1 to 8, further including
an external information inquiry means configured to transmit a request including destination specification information indicating the destination recorded in a log allowing specification of only the destination of a communication related to the cyberattack, out of the log, to one or more information sources each providing information in response to a request received through a communication network, and when a response received from the information source does not include source specification information indicating the source recorded in a log allowing specification of only the source of a communication related to the cyberattack, out of the log, receive the response including the source specification information by repeating processing of transmitting, to the information source, the request including specific information included in the response, and then associate the destination specification information with the source specification information included in the response, wherein
the display information generation means generates the display information including the attack situation image related to the cyberattack between the source specification information and the destination specification information that are associated by the external information inquiry means.

Supplementary Note 11

The attack situation visualization device according to supplementary note 9 or 10, wherein
the external information inquiry means includes:
one or more crawlers each executing a search related to the information source by transmitting the request to the information source and receiving the response to the request; and
an analysis model receiving information included in the request, as an input, and calculating a score for each of the crawlers capable of transmitting the request, and,
when transmitting the request, selects the crawler with the highest score calculated by inputting information included in the request to the analysis model and transmits the request to the information source by use of the selected crawler.

Supplementary Note 12

The attack situation visualization device according to supplementary note 11, wherein
the analysis model is a model undergoing learning, by use of training data including one or more pairs of a piece of the source specification information and a piece of the destination specification information a correspondence relation between which is previously specified, in such a way as to increase the score related to the crawler capable of acquiring the response including either of the source specification information and the destination specification information that are included in the training data, out of one or more of the crawlers, by transmitting the request including another of the source specification information and the destination specification information that are included in the training data to the information source.

Supplementary Note 13

The attack situation visualization device according to any one of supplementary notes 1 to 8, further including
an external information inquiry means configured to associate the source with the destination, based on a response acquired by transmitting at least either of source specification information indicating the source recorded in a log allowing specification of only the source of a communication related to the cyberattack, out of the log, and destination specification information indicating the destination recorded in a log allowing specification of only the destination of a communication related to the cyberattack, out of the log, to one or more information sources each providing information in response to a request received through a communication network, wherein
the display information generation means generates the display information including the attack situation image related to the cyberattack between the source specification information and the destination specification information that are associated by the external information inquiry means.

Supplementary Note 14

An attack situation visualization method including:
analyzing a log in which information about a cyberattack is recorded and specifying at least either of a source of a communication related to the cyberattack and a destination of a communication related to the cyberattack;
generating display information allowing display of an image in which an image representing a map, a source image representing the source, and a destination image representing the destination are arranged on the map; and,
when a correspondence relation between the source and the destination to which a communication related to the cyberattack is transmitted from the source is specified, generating the display information including an attack situation image visualizing at least either of a traffic volume and a communication frequency of a communication related to the cyberattack between the source and the destination.

Supplementary Note 15

A recording medium having an attack situation visualization program recorded thereon, the attack situation visualization program causing a computer to execute:
processing of analyzing a log in which information about a cyberattack is recorded and specifying at least either of a source of a communication related to the cyberattack and a destination of a communication related to the cyberattack;
processing of generating display information allowing display of an image in which an image representing a map, a source image representing the source, and a destination image representing the destination are arranged on the map; and
processing of, when a correspondence relation between the source and the destination to which a communication related to the cyberattack is transmitted from the source is specified, generating the display information including an attack situation image visualizing at least either of a traffic volume and a communication frequency of a communication related to the cyberattack between the source and the destination.

REFERENCE SIGNS LIST

100 Attack situation visualization device
101 Log analysis unit
102 Display information generation unit
500 Attack situation visualization device
501 Log analysis unit
502 Display information generation unit
503 Log collection unit
504 External information inquiry unit
2200 Attack situation visualization device
2201 External information inquiry unit
2501 Processor
2502 Memory
2503 Nonvolatile storage device
2504 Reader-writer
2505 Recording medium
2506 Network interface
2507 Input-output interface

The invention claimed is:

1. An attack situation visualization device comprising:
at least one memory that stores instructions; and
at least one processor configured to process the instructions to:
identify a first country in which a source is located and a second country in which a destination is located, based on communication records related to a cyberattack from the source to the destination;
control display of map image data representing a map; and
control display of an attack situation image on the map image data that represents communication between the first country and the second country,
wherein the attack situation image is displayed between a location of the first country on the map and a location of the second country on the map, and
wherein a rate at which an animation of the attack situation image changes is varied according to a frequency of the communication.

2. The attack situation visualization device according to claim 1, wherein the attack situation image represents a direction of the cyberattack from the source to the destination by changing a display form of the attack situation image.

3. The attack situation visualization device according to claim 2, wherein the display form comprises animation.

4. The attack situation visualization device according to claim 1, wherein the attack situation image comprises a line.

5. The attack situation visualization device according to claim 1, wherein the at least one processor is further configured to vary the attack situation image based on a volume or a frequency of the communication.

6. The attack situation visualization device according to claim 5, wherein the at least one processor is further configured to reduce a size of the attack situation image based on the volume of the communication decreasing.

7. The attack situation visualization device according to claim 5, wherein the at least one processor is further configured to control animation of the attack situation image based on the frequency of the communication.

8. The attack situation visualization device according to claim 1, wherein the at least one processor is further configured to control display of a source image representing the source and a destination image representing the destination on the map image data.

9. The attack situation visualization device according to claim 8, wherein the at least one processor is further configured to control a display form of the source image according to at least one of a volume and a frequency relating to the communication sent from the source.

10. An attack situation visualization device comprising:
at least one memory that stores instructions; and
at least one processor configured to process the instructions to:
identify a source of a cyberattack based on communication records relating to communication concerning the cyberattack;
control display of map image data representing a map;
control display of an attack situation image between a first position corresponding to the source and a second position corresponding to a destination of the communication;
modify the attack situation image based on a direction of the cyberattack, and either a volume or a frequency of the communication; and
animate the attack situation image based on the frequency,
wherein the attack situation image is displayed between a location of the source on the map and a location of the destination on the map, wherein a rate at which an animation of the attack situation image changes is varied according to the frequency.

11. The attack situation visualization device according to claim 10, wherein the at least one processor is further configured to animate the attack situation image based on the direction and the volume.

12. The attack situation visualization device according to claim 10, wherein the attack situation image comprises a line.

13. The attack situation visualization device according to claim 10, wherein the at least one processor is further configured to control display of a source image representing the source and a destination image representing the destination on the map image data.

14. The attack situation visualization device according to claim 13, wherein the at least one processor is further configured to control a display form of the source image according to at least one of a source volume and a source frequency relating to the communication sent from the source.

15. An attack situation visualization device comprising:
at least one memory that stores instructions; and
at least one processor configured to process the instructions to:
identify a source of a cyberattack based on communication records relating to the cyberattack;
control display of a map and an attack status image; and
vary a size of a drawing element of the attack status image according to a scale of the cyberattack,
wherein the drawing element extends from a location on the map of the source to a location on the map of a destination of the cyberattack, and
wherein a rate at which an animation of the attack status image changes is varied according to a frequency of the communication.

16. The attack situation visualization device according to claim 15, wherein the scale of the cyberattack corresponds to a volume of communication sent from the source.

17. An attack situation visualization method comprising:
identifying a first country in which a source is located and a second country in which a destination is located, based on communication records related to a cyberattack from the source to the destination;
controlling display of map image data representing a map; and
controlling display of an attack situation image on the map image data that represents communication between the first country and the second country,
wherein the attack situation image is displayed between a location of the first country on the map and a location of the second country on the map, and
wherein a rate at which an animation of the attack situation image changes is varied according to a frequency of the communication.

18. The attack situation visualization method according to claim 17, wherein the attack situation image represents a direction of the cyberattack from the source to the destination by changing a display form of the attack situation image.

19. The attack situation visualization method according to claim 18, wherein the display form comprises animation.

20. The attack situation visualization method according to claim 17, wherein the attack situation image comprises a line.

21. The attack situation visualization method according to claim 17, further comprising varying the attack situation image based on a volume or a frequency of the communication.

22. The attack situation visualization method according to claim 21, further comprising reducing a size of the attack situation image based on the volume of the communication decreasing.

23. The attack situation visualization method according to claim 21, further comprising controlling animation of the attack situation image based on the frequency of the communication.

24. The attack situation visualization method according to claim 17, further comprising controlling display of a source image representing the source and a destination image representing the destination on the map image data.

25. The attack situation visualization method according to claim 24, further comprising controlling a display form of the source image according to at least one of a volume and a frequency relating to the communication sent from the source.

26. An attack situation visualization method comprising:
identifying a source of a cyberattack based on communication records relating to communication concerning the cyberattack;
controlling display of map image data representing a map;
controlling display of an attack situation image between a first position corresponding to the source and a second position corresponding to a destination of the communication;
modifying the attack situation image based on a direction of the cyberattack, and either a volume or a frequency of the communication; and
animate the attack situation image based on the frequency,
wherein the attack situation image is displayed between a location of the source on the map and a location of the destination on the map, wherein a rate at which an animation of the attack situation image changes is varied according to the frequency.

27. The attack situation visualization method according to claim 26, further comprising animating the attack situation image based on the direction and the volume.

28. The attack situation visualization method according to claim 26, wherein the attack situation image comprises a line.

29. The attack situation visualization method according to claim 26, further comprising controlling display of a source image representing the source and a destination image representing the destination on the map image data.

30. The attack situation visualization method according to claim 29, further comprising controlling a display form of the source image according to at least one of a source volume and a source frequency relating to the communication sent from the source.

31. An attack situation visualization method comprising:
identifying a source of a cyberattack based on communication records relating to the cyberattack;
controlling display of a map and an attack status image; and
varying a size of a drawing element of the attack status image according to a scale of the cyberattack,
wherein the drawing element extends from a location on the map of the source to a location on the map of a destination of the cyberattack, and
wherein a rate at which an animation of the attack status image changes is varied according to a frequency of the communication.

32. The attack situation visualization method according to claim 31, wherein the scale of the cyberattack corresponds to a volume of communication sent from the source.

33. A non-transitory computer readable recording medium having an attack situation visualization program recorded thereon, the attack situation visualization program causing a computer to execute a method, the method including:
identifying a first country in which a source is located and a second country in which a destination is located, based on communication records related to a cyberattack from the source to the destination;
controlling display of map image data representing a map; and
controlling display of an attack situation image on the map image data that represents communication between the first country and the second country,
wherein the attack situation image is displayed between a location of the first country on the map and a location of the second country on the map, and
wherein a rate at which an animation of the attack situation image changes is varied according to a frequency of the communication.

34. A non-transitory computer readable recording medium having an attack situation visualization program recorded thereon, the attack situation visualization program causing a computer to execute a method, the method including:
identifying a source of a cyberattack based on communication records relating to communication concerning the cyberattack;
controlling display of map image data representing a map;
controlling display of an attack situation image between a first position corresponding to the source and a second position corresponding to a destination of the communication;
modifying the attack situation image based on a direction of the cyberattack, and either a volume or a frequency of the communication; and
animate the attack situation image based on the frequency,
wherein the attack situation image is displayed between a location of the source on the map and a location of the destination on the map, wherein a rate at which an animation of the attack situation image changes is varied according to the frequency.

35. A non-transitory computer readable recording medium having an attack situation visualization program recorded thereon, the attack situation visualization program causing a computer to execute a method, the method including:
  identifying a source of a cyberattack based on communication records relating to the cyberattack;
  controlling display of a map and an attack status image; and
  varying a size of a drawing element of the attack status image according to a scale of the cyberattack,
  wherein the drawing element extends from a location on the map of the source to a location on the map of a destination of the cyberattack, and
  wherein a rate at which an animation of the attack status image changes is varied according to a frequency of the communication.

* * * * *